US011961378B2

(12) United States Patent
Wang

(10) Patent No.: US 11,961,378 B2
(45) Date of Patent: Apr. 16, 2024

(54) ASPIRATING SMOKE SENSING DEVICE, METHOD, AND APPARATUS FOR FIRE DETECTION

(71) Applicant: Yongqiang Wang, Beijing (CN)

(72) Inventor: Yongqiang Wang, Beijing (CN)

( * ) Notice: Subject to any disclaimer, the term of this patent is extended or adjusted under 35 U.S.C. 154(b) by 152 days.

(21) Appl. No.: 17/870,590

(22) Filed: Jul. 21, 2022

(65) Prior Publication Data

US 2022/0366770 A1 Nov. 17, 2022

Related U.S. Application Data

(63) Continuation of application No. PCT/CN2020/121890, filed on Oct. 19, 2020.

(30) Foreign Application Priority Data

Feb. 25, 2020 (CN) ......................... 202010116032.3

(51) Int. Cl.

*G08B 17/10* (2006.01)
*B03C 3/45* (2006.01)
*G08B 17/12* (2006.01)

(52) U.S. Cl.

CPC ................ *G08B 17/10* (2013.01); *B03C 3/45* (2013.01); *G08B 17/12* (2013.01)

(58) Field of Classification Search

CPC ........ G08B 17/10; G08B 17/12; G08B 17/11; G08B 17/113; B03C 3/45; B03C 3/017; B03C 2201/06; B03C 2201/24; B03C 3/12; B03C 3/41; B03C 3/49; B03C 3/0175

See application file for complete search history.

(56) References Cited

U.S. PATENT DOCUMENTS 3,913,082 A * 10/1975 Hamm ................. G08B 17/113 313/54
4,053,776 A * 10/1977 Hertzberg .............. G01N 27/66 250/382

(Continued)

FOREIGN PATENT DOCUMENTS

CN 2078000 U 5/1991
CN 1565750 A 1/2005

(Continued)

OTHER PUBLICATIONS

The First Office Action dated Mar. 19, 2021 from the State Intellectual Property Office of People's Republic of China for Application No. 202010116032.3.

(Continued)

*Primary Examiner* — Curtis J King

(57) ABSTRACT

An aspirating smoke sensing device, method, and apparatus for fire detection are provided, and the device is provided with a charger (2), a charge collector (3), a controller (4), an air intake structure (1), and a negative pressure source for air path detection (9). The air intake structure (1) is communicated with an input port of the charger (2), an output port of the charger (2) is communicated with the charge collector (3), an output port of the charge collector (3) is communicated with the negative pressure source for air path detection (9), and the controller (4) is electrically connected to the charge collector (3).

19 Claims, 19 Drawing Sheets

(56) References Cited

U.S. PATENT DOCUMENTS

| | | | | | |
|---|---|---|---|---|---|
| 4,213,047 | A * | 7/1980 | McCord | G08B 17/11 250/385.1 |
| 4,266,219 | A * | 5/1981 | Foster | G08B 29/043 340/630 |
| 4,967,187 | A | 10/1990 | Dumas et al. | |
| 5,353,879 | A * | 10/1994 | Watanabe | A62B 5/00 239/289 |
| 6,960,987 | B2 * | 11/2005 | Dohi | G08B 25/14 340/506 |
| 7,196,631 | B1 * | 3/2007 | Dziekan | G08B 17/10 340/629 |
| 7,649,450 | B2 * | 1/2010 | Campion, Jr. | G08B 29/145 340/506 |
| 7,821,412 | B2 * | 10/2010 | Fink | G08B 17/11 340/630 |
| 8,884,771 | B2 * | 11/2014 | Cooke | G08B 17/113 340/603 |
| 9,201,051 | B2 * | 12/2015 | Lewiner | G08B 17/107 |
| 9,207,209 | B2 * | 12/2015 | Cooke | H03M 3/30 |
| 9,824,563 | B2 * | 11/2017 | Uchida | G08B 17/10 |
| 9,911,317 | B2 * | 3/2018 | Breed | G08B 29/18 |
| 10,360,789 | B2 * | 7/2019 | Brown | G08B 29/145 |
| 10,739,323 | B2 * | 8/2020 | Desjardins | G08B 25/006 |
| 11,170,621 | B1 * | 11/2021 | Hillery | G08B 17/10 |
| 11,232,703 | B1 * | 1/2022 | Wolf | H04L 63/0876 |
| 11,244,551 | B2 * | 2/2022 | Escofet Via | G08B 17/06 |
| 11,694,540 | B1 * | 7/2023 | Sandeep | G08B 29/043 340/506 |
| 11,789,000 | B2 * | 10/2023 | Maurel | G01N 33/0062 73/31.01 |
| 11,798,387 | B2 * | 10/2023 | P | G08B 25/00 |
| 2003/0058093 | A1 * | 3/2003 | Dohi | G08B 17/00 340/506 |
| 2006/0120516 | A1 * | 6/2006 | Armbruster | H04M 3/5116 379/37 |
| 2008/0128609 | A1 | 6/2008 | Miller et al. | |
| 2008/0252473 | A1 * | 10/2008 | Fink | G08B 17/11 340/629 |
| 2009/0267273 | A1 * | 10/2009 | Kaneda | C04B 35/478 264/631 |
| 2011/0298623 | A1 * | 12/2011 | Lenkeit | G08B 17/11 340/628 |
| 2012/0146798 | A1 * | 6/2012 | Dziekan | G01T 1/185 250/374 |
| 2012/0160997 | A1 * | 6/2012 | Fink | H01J 49/10 250/288 |
| 2012/0325502 | A1 * | 12/2012 | Hennegan | A62C 35/62 169/37 |
| 2013/0154657 | A1 * | 6/2013 | Cooke | G01N 27/66 324/464 |
| 2013/0154670 | A1 * | 6/2013 | Cooke | G08B 17/11 324/672 |
| 2013/0334417 | A1 * | 12/2013 | Lewiner | G01N 33/0009 250/338.5 |
| 2015/0145421 | A1 * | 5/2015 | Chung | H05B 47/175 315/158 |
| 2016/0225243 | A1 * | 8/2016 | Albass | G08B 25/10 |
| 2017/0249819 | A1 * | 8/2017 | Uchida | G08B 17/10 |
| 2017/0374722 | A1 * | 12/2017 | Beiner | H05B 47/115 |
| 2019/0197855 | A1 * | 6/2019 | Lingala | G08B 27/00 |
| 2019/0244504 | A1 * | 8/2019 | Ebata | G08B 25/009 |
| 2019/0279478 | A1 * | 9/2019 | Ebata | G06N 3/045 |
| 2019/0291866 | A1 * | 9/2019 | Jegodtka | G08B 29/145 |
| 2020/0394900 | A1 * | 12/2020 | Lontka | G06T 7/90 |
| 2021/0065536 | A1 * | 3/2021 | Dearden | G08B 17/10 |
| 2021/0197000 | A1 * | 7/2021 | Kypbida | A62C 35/62 |
| 2021/0339629 | A1 * | 11/2021 | Jia | B60K 35/22 |
| 2021/0364486 | A1 * | 11/2021 | Maurel | G01N 33/0062 |
| 2022/0036722 | A1 * | 2/2022 | Greenwood | G08B 27/001 |
| 2022/0068102 | A1 * | 3/2022 | Staeger | H05K 1/18 |
| 2022/0335799 | A1 * | 10/2022 | P | G08B 5/226 |
| 2022/0335812 | A1 * | 10/2022 | Arora | G08B 27/001 |
| 2022/0366778 | A1 * | 11/2022 | Barson | G08B 29/04 |
| 2023/0343204 | A1 * | 10/2023 | Ganesan | G08B 29/043 |

FOREIGN PATENT DOCUMENTS

| | | | |
|---|---|---|---|
| CN | 101675496 | A | 3/2010 |
| CN | 101809426 | A | 8/2010 |
| CN | 201796460 | U | 4/2011 |
| CN | 102257543 | A | 11/2011 |
| CN | 102500559 | A | 6/2012 |
| CN | 203055083 | U | 7/2013 |
| CN | 103257095 | A | 8/2013 |
| CN | 102257543 | B | 6/2014 |
| CN | 103854431 | A | 6/2014 |
| CN | 104285140 | A | 1/2015 |
| CN | 104464166 | A | 3/2015 |
| CN | 104792676 | A | 7/2015 |
| CN | 105354972 | A | 2/2016 |
| CN | 205751126 | U | 11/2016 |
| CN | 106226483 | A | 12/2016 |
| CN | 107138277 | A | 9/2017 |
| CN | 107185344 | A | 9/2017 |
| CN | 108120623 | A | 6/2018 |
| CN | 108325749 | A | 7/2018 |
| CN | 109085097 | A | 12/2018 |
| CN | 109469533 | A | 3/2019 |
| CN | 109635883 | A | 4/2019 |
| CN | 109709004 | A | 5/2019 |
| CN | 109858010 | A | 6/2019 |
| CN | 110440358 | A | 11/2019 |
| CN | 110479066 | A | 11/2019 |
| CN | 210401139 | U | 4/2020 |
| CN | 210665415 | U | 6/2020 |
| CN | 111402540 | A | 7/2020 |
| DE | 60005789 | T2 | 7/2004 |
| DE | 202009013497 | U1 | 2/2011 |
| DE | 202010017579 | U1 | 3/2012 |
| EP | 0405473 | A2 | 1/1991 |
| JP | S61101260 | A | 5/1986 |
| JP | 2018173967 | A | 11/2018 |
| WO | WO8401650 | A1 | 4/1984 |
| WO | WO2008/142801 | A1 | 11/2008 |

OTHER PUBLICATIONS

The Notification to Grant Patent Right for Invention dated Jul. 13, 2021 from the State Intellectual Property Office of People's Republic of China for Application No. 202010116032.3.

Written Opinion and International Search Report dated Jan. 18, 2021 for International application No. PCT/CN2020/121890.

The Extended European Search Report for European Patent Application No. 20921540.9, dated Jul. 12, 2023.

* cited by examiner

ASPIRATING SMOKE SENSING DEVICE, METHOD, AND APPARATUS FOR FIRE DETECTION

CROSS-REFERENCE TO RELATED APPLICATIONS

The present application is a continuation of International Application No. PCT/CN2020/121890, filed on Oct. 19, 2020, which claims priority to Chinese Patent Application No. 202010116032.3 filed with the China National Intellectual Property Administration on Feb. 25, 2020. The disclosures of the aforementioned applications are hereby incorporated by reference in their entireties.

TECHNICAL FIELD

The present disclosure relates to the field of smoke sensing detector, and in particular, to an aspirating smoke sensing device, method, and apparatus for fire detection.

BACKGROUND

For most fires, especially in an early stage of an electrical fire, the surface temperature of an electronic component is in a gradual increase. Due to abnormalities, the highest surface temperature may reach more than hundreds of degrees, pyrolytic particles generally begin to spill out when the surface temperature of the electronic component is about 60° C., and a particle-size at this stage is mainly below 1 nanometer to several tens of nanometers. Particles with a particle-size of nearly 100 nm are obtained by decomposition when the surface temperature of the electronic component is 100° C. Particles with a particle-size gradually increasing to 150 nm-300 nm are obtained by decomposition when the surface temperature of the electronic component progresses to 140-150° C. When the surface temperature of the substance reaches hundreds of degrees in a later stage, particles with a large particle-size of several hundred nanometers spill out.

In the prior art, an ordinary smoke sensing probe may only detect the large particles in the later stage by using an ordinary luminous tube in accordance with the light scattering and receiving principles.

A laser aspirating smoke sensing method for fire detection may detect particles with a medium particle-size in middle and later stages during a pyrolysis, which has a higher sensitivity than that of the ordinary smoke sensing method.

The laser aspirating smoke sensing method for fire detection includes following steps. A laser transmitter emits a laser light to an air sample, and the laser light are scattered after particles in the air sample are irradiated by the laser light, and a laser receiver receives the scattered laser light, so as to form an electrical signal. The level of the electrical signal represents information about the number and size of particles.

This method cannot sense particles with a particle-size of less than 150 nm generated in an extremely early stage. A wavelength of a red laser light is 650 nanometers, and a wavelength of a blue laser light is 450 nanometers. Due to the limitation of a light wavelength, in a case where a particle-size of a particle irradiated by the light is less than ⅓ of the wavelength of the light, intensities of lights scattered in various directions are almost zero. Therefore, only particles with a particle-size of larger than ⅓ of the wavelength can be generally detected. Particles with a particle-size of larger than 200 nm are generally detected by the red laser light. Particles with a particle-size of larger than 150 nm are generally detected by the blue laser light, and an efficiency of particles smaller than this size to be detected by the laser light is greatly reduced, or even the particles smaller than this size almost cannot be sensed. Therefore, the particle-size of a smallest particle that is able to be detected by the laser detection method in the prior art is about 150 nanometers. In most fires, especially in the early stage of the electrical fire, a particle-size of a particle spilling out from a surface of a material is extremely small, which is often smaller than a lower limiting value that is able to be detected by the laser detection. Therefore, it is difficult to detect early fires in time.

In the prior art, there is a cloud chamber aspirating smoke sensing method for fire detection. The method cannot sense particles with a particle-size below 2 nm, and has a low sensitivity to smoke particles with a large particle-size.

In a normal monitoring, in a case where no fire exists, the number of large and small particles in a clean environment is about tens of thousands per cubic centimeter. A detection method of the cloud chamber aspirating smoke sensing apparatus for fire detection is to humidify an air sample, and then reduce a pressure instantaneously, so that the temperature of the air sample drops sharply, and thus individual particles of different particles with a particle-size above 2 nm in the air sample are wrapped by supersaturated water vapor to form uniform individual fog droplets with a size of 20 μm, and then the number of the fog droplets are counted by a laser light. Therefore, the method cannot distinguish the particle size of the detected particles. A set threshold value of this type of detector is a concentration value that is about 100% higher than a concentration value of particles in an environment in which no fire is present, and a normal fluctuation is generally ±10-20%. To reduce a false alarm, the set threshold value may be higher. When some substances particularly susceptible to thermal decomposition, such as a polyurethane foam material, encounter a small open flame and burn without a smoldering process, the substance will quickly decompose into large particles with a particle-size of about above 200 nm, and the particle-size thereof is large and the number thereof is small. The concentration value displayed on this type of detector is increased by about hundreds or thousands per cubic centimeter, which is hardly increased compared with the tens of thousands of particles in air in which no fire is present, and is generally submerged in a normal fluctuation of background value. Therefore, the method cannot promptly alarm for fires having no smoldering process, resulting in missed alarms or delayed alarms, and such method has high maintenance costs. In order to make the air sample reach a high humidity, water is required to be added regularly, and in order to make the air sample with the high humidity cool to a supersaturated state, the pressure of the air sample is required to be greatly reduced instantaneously to form a sudden drop in temperature, and a negative pressure of a high-pressure negative pressure pump used cooperatively is up to above 100 kpa. This type of negative pressure pump works in a high negative pressure state for a long time, and the service life of the high negative pressure pump with best quality currently is only tens of thousands of hours, which does not meet requirements for a long-term uninterrupted use of a fire alarm device.

With regard to the prior art, such as the "METHOD and APPARATUS FOR EARLY FIRE DETECTION" described in the patent CN102257543B, it relates to a method for an early fire detection based on an on-site detection of characteristic volatile pyrolysis products of one or several substances to be monitored, and an apparatus for the early fire detection by means of a detection of the characteristic volatile pyrolysis products specific to the substances to be monitored. Ambient air is drawn from an area to be monitored for a fire and is ionized. The ionized airflow is directly guided through an electromagnetic field, and the electromagnetic field is controlled by a set of electrical parameters to generate a field strength in time space, thereby changing a flight trajectory of ions, so that the positive and negative ions of the ionized gas are each forced to a predetermined flight trajectory, and received by a receiving pole of an electrometer.

Data of the set of parameters of the electromagnetic field is artificially captured and stored in the apparatus according to the characteristics of particles released by the pyrolysis or combustion of one or several materials, which is used for analysis and comparison during monitoring. Different substances have different sets of parameters of the electromagnetic field. By distinguishing whether a pyrolysis gas signal is sent by a protected object or a non-protected object, whether to output an alarm is judged. The advantage of the method is that it may effectively avoid false alarms caused by some non-protected objects, such as cigarette particles caused by an artificial smoking in a work shop of a wood processing plant.

However, the method requires that corresponding parameter sets for gases that are thermally decomposed from all substances in a protected space must be captured in advance and stored in the apparatus, and the substances in an on-site protection area are different and various. Combined substances are complex in structure, so that it is impossible for a user to capture the parameters of all single substances or mixed substances in the protected area during thermal decomposition, and configure them well in the apparatus, which makes it more difficult to accurately judge the occurrence of fire. If the parameter set corresponding to a certain inflammable on site is not stored in the apparatus, when the substance is in fire, the detector fails to identify and generates a missed alarm. Therefore, the use of the apparatus is greatly limited for users. For a fire monitoring in warehouse and logistics sites, the method is not applicable due to a fact that substances stored in the warehouse are various, and change irregularly.

The method detects pyrolytic particles produced by an object at about 200 degrees, and at this stage, most materials have pyrolytic particles with a particle-size of about 300 nm. The method detects particles in a narrow range of particle-size about 300 nm. In an extremely early stage of a development of an actual fire, particles with a particle-size below 1 nm to several tens of nanometers may be obtained by pyrolysis when the temperature of the object is about 50° C. Therefore, the method also cannot meet requirements for fire detection in the extremely early (pyrolysis) stage.

An ionization device in the method uses a radioactive radiation source (such as 63Ni) or a UV light source, and 63Ni is a radioactive element. The radioactive source must be used after the relevant national departments have gone through the registration application procedure and the license is obtained, and during a use process, special qualified personnel are required to keep the radioactive source, so that the use and treatment processes are quite complicated. The service life of the UV light source is short. A general UV lamp emits rated energy generally for several hundred hours, and a long-life UV light source emits rated energy generally for several thousand hours. Therefore, the core element increases the use difficulty and the use cost, which adds a great limitation to the fire warning industry from the practicability.

A laser aspirating smoke sensing apparatus for fire detection is currently considered to be a high-sensitivity detection apparatus in the fire protection industry, which is also referred to as an air sampling-type smoke sensing alarm for fire detection, and is also an extremely early smoke sensing alarm for fire detection defined in the early market. The laser aspirating smoke sensing apparatus for fire detection has occupied the market for 20 to 30 years, and a current market share is above 95%. The laser aspirating smoke sensing apparatus for fire detection uses a laser with a certain wavelength and a higher brightness, and is able to effectively capture smoke particles with a smaller particle-size generated when the inflammable smolders. A minimum particle-size detected is generally ⅓ of the wavelength of the laser light source used. Experimental data and theoretical data prove that the laser aspirating smoke sensing apparatus for fire detection in the current market does not have any detection capability on particles below 150 nm, and cannot achieve an extremely early fire monitoring.

SUMMARY

The present disclosure provides an aspirating smoke sensing device, method and apparatus for fire detection, for solving a problem that an extremely early fire hazard cannot be found in time.

According to a first aspect of embodiments of the present disclosure, the present disclosure provides an aspirating smoke sensing device for fire detection. The device includes a charger, a charge collector, a controller, an air intake structure, and a negative pressure source for air path detection, the air intake structure is communicated with an input port of the charger, an output port of the charger is communicated with the charge collector, an output port of the charge collector is connected to the negative pressure source for air path detection, and the controller is electrically connected to the charge collector;

the air intake structure is configured to acquire an air sample, and the negative pressure source for air path detection draws the air sample into the charger and the charge collector, and discharges the air sample;

the charger is configured to perform a unipolar charging on the air sample, so as to output a unipolar charged air sample;

the charge collector is configured to obtain the unipolar charged air sample, and separate charged particles with different particle-sizes in the unipolar charged air sample, so as to obtain charged particles of different particle-size grades.

The negative pressure source for air path detection forms a negative pressure area in the charger, the charge collector, and pipelines, so as to draw the air sample obtained by the air intake structure into the charger and the charge collector, and discharge the air sample;

the controller is configured to determine fire detection information according to charge quantity corresponding to the charged particles of different particle-size grades.

Optionally, the aspirating smoke sensing device for fire detection further includes a coagulator. An input port of the coagulator is communicated with the air intake structure, and an output port of the coagulator is communicated with the charger;

the coagulator is configured to perform a collisional coagulation on the air sample, so as to coagulate micro particle-size particles and small particle-size particles in the air sample into large particle-size particles.

Optionally, the coagulator is specifically configured to:

perform a bipolar charging on the air sample, so as to obtain a bipolar charged air sample;

perform the collisional coagulation on the bipolar charged air sample, so as to increase the particle-size of particles in the air sample;

the particles in the air sample include the micro particle-size particles, the small particle-size particles, and large particle-size particles.

Optionally, the aspirating smoke sensing device for fire detection further includes a first filter and a second filter. An input port of the first filter is communicated with the air intake structure, and an output port of the first filter is communicated with an input port of the second filter and one input port of the coagulator. An output port of the second filter is communicated with another input port of the coagulator;

a filtering material of the first filter has a larger gap than a filtering material of the second filter;

the first filter is configured to filter the air sample, so as to obtain a first filtered air sample;

the second filter is configured to filter the first filtered air sample, so as to obtain a second filtered air sample that is a clean air;

correspondingly, when performing the collisional coagulation on the air sample to increase the particle-sizes of the particles in the air sample, the coagulator is specifically configured to:

mix the first filtered air sample and the second filtered air sample, so as to obtain a mixed gas sample with a preset particle concentration;

the second filtered air sample is a clean air, and serves to purge and protect bipolar charging needles in the coagulator while blowing out positive and negative ion flows between the bipolar charging needles to be mixed with the first filtered air sample;

the collisional coagulation is performed on the mixed gas sample, so as to increase the particle-sizes of the particles in the air sample.

Optionally, the charger is a positive-charge charger, and the charger is specifically configured to:

obtain the air sample transmitted by the air intake structure;

perform a positive charging on particles in the air sample, so as to obtain a unipolar charged air sample with positively charged particles.

Optionally, the charge collector includes a bias electrode, a collecting electrode, and a collecting electric field formed by the bias electrode and the collecting electrode, and a negative pressure fluid field. The collecting electrode includes a plurality of sub-collecting electrodes, and the negative pressure fluid field is an air path model for endowing particles in the air sample with kinetic energy to move forward, which is formed between the negative pressure source for air path detection and an annular narrow jet orifice of the air sample in the charge collecting electrode. The charge collector is specifically configured to:

receive a control parameter sent by the controller;

adjust a voltage of the bias electrode according to the control parameter, so that the charged particles with different particle-sizes in the unipolar charged air sample fall onto the plurality of sub-collecting electrodes corresponding to particle-size grades of the charged particles.

Optionally, the collecting electrodes include a large particle collecting electrode and a small particle collecting electrode, and the controller is specifically configured to:

obtain voltage signals or current signals formed by charge quantities corresponding to charged particles in respective sub-collecting electrodes;

determine corresponding fire detection information according to the voltage signals or the current signals corresponding to the respective sub-collecting electrodes.

Optionally, the sub-collecting electrode includes a large particle collecting electrode and a small particle collecting electrode.

Optionally, when determining the corresponding fire detection information according to the voltage signals or the current signals corresponding to the respective sub-collecting electrodes, the controller is specifically configured to:

generate early fire detection information, if the voltage signal or the current signal of the small particle collecting electrode is greater than a first preset threshold value and the voltage signal or the current signal of the large particle collecting electrode is less than a second preset threshold value;

generate serious fire detection information, if the voltage signal or the current signal of the large particle collecting electrode is greater than or equal to the second preset threshold value.

According to a second aspect the embodiments of the present disclosure, the present disclosure provides an aspirating smoke sensing method for fire detection. The method is applied to an aspirating smoke sensing device for fire detection, and the device includes a charger, a charge collector, a controller, an air intake structure, and a negative pressure source for air path detection. The method includes:

obtaining, by the air intake structure, an air sample;

performing, by the charger, a unipolar charging on the air sample, so as to output a unipolar charged air sample;

obtaining, by the charge collector, the unipolar charged air sample, and making charged particles with different particle-sizes in the unipolar charged air sample fall onto corresponding collecting electrodes;

forming, by the negative pressure source for air path detection, a negative pressure area in the charger, the collector and pipelines, so as to draw the air sample obtained by the air intake structure into the charger and the charge collector, and discharge the air sample;

generating, by the controller, fire detection information according to charge quantity obtained by the collecting electrodes.

Optionally, the device further includes a coagulator. Before the charger performs the unipolar charging on the air sample, so as to output the unipolar charged air sample, the method further includes:

performing, by the coagulator, collisional coagulation on the air sample, so as to coagulate micro particle-size particles and small particle-size particles in the air sample into large particle-size particles.

Optionally, the performing, by the coagulator, collisional coagulation on the air sample, so as to coagulate the micro particle-size particles and the small particle-size particles in the air sample into the large particle-size particles, includes:

performing, by the coagulator, a bipolar charging on the air sample, so as to obtain a bipolar charged air sample;

performing, by the coagulator, the collisional coagulation on the bipolar charged air sample, so as to increase the particle-sizes of particles in the air sample;

the particles in the air sample including the micro particle-size particles, the small particle-size particles, and large particle-size particles.

Optionally, the aspirating smoke sensing device for fire detection further includes a first filter and a second filter. The first filter has a lower filtration density than the second filter. Before the coagulator performs the collisional coagulation on the air sample, so as to coagulate the micro particle-size particles and the small particle-size particles into the large particle-size particles in the air sample, the method further includes:

filtering, by the first filter, the air sample, so as to obtain a first filtered air sample;

filtering, by the second filter, the first filtered air sample, so as to obtain a second filtered air sample that is a clean air;

correspondingly, the performing, by the coagulator, collisional coagulation on the air sample to increase the particle-sizes of the particles in the air sample, includes:

mixing the first filtered air sample and the second filtered air sample, so as to obtain a mixed gas sample with a preset particle concentration;

the second filtered air sample is the clean air, and also serves to purge and protect bipolar charging needles in the coagulator while blowing out positive and negative ions between the bipolar charging needles to be mixed with the first filtered air sample;

the collisional coagulation is performed on the mixed gas sample, so as to increase the particle-sizes of the particles in the air sample.

Optionally, the performing, by the charger, a unipolar charging on the air sample, so as to output a unipolar charged air sample, includes:

acquiring, by the charger, an air sample transmitted by the air intake structure;

performing, by the charger, a positive charging on particles in the air sample, so as to obtain a unipolar charged air sample with positively charged particles.

Optionally, the charge collector includes a bias electrode, a collecting electrode, and a collecting electric field formed by the bias electrode and the collecting electrode, and a negative pressure fluid field. The collecting electrode includes a plurality of sub-collecting electrodes, and the negative pressure fluid field is an air path model for endowing particles in the air sample with kinetic energy to move forward and formed between the negative pressure source for air path detection and an annular narrow jet orifice of the air sample in the charge collecting electrode. The acquiring, by the charge collector, the unipolar charged air sample, and making the charged particles with different particle-sizes in the unipolar charged air sample fall onto corresponding collecting electrodes, includes:

receiving, by the charge collector, a control parameter sent by the controller;

adjusting, by the charge collector, a voltage of the bias electrode according to the control parameter, so that the charged particles with different particle-sizes in the unipolar charged air sample fall onto sub-collecting electrodes corresponding to particle-size grades of the charged particles.

Optionally, the collecting electrodes include a large particle collecting electrode and a small particle collecting electrode. The generating, by the controller, fire detection information according to the charge quantity obtained by the collecting electrodes, includes:

acquiring, by the controller, voltage signals or current signals formed by charge quantity corresponding to charged particles in respective sub-collecting electrodes;

determining corresponding fire detection information according to the voltage signals or current signals corresponding to the respective sub-collecting electrodes.

Optionally, the sub-collecting electrodes include a large particle collecting electrode and a small particle collecting electrode.

Optionally, the determining, by the controller, the corresponding fire detection information according to the voltage signals or the current signals corresponding to the sub-collecting electrodes, includes:

generating early fire detection information, if the voltage signal or current signal of the small particle collecting electrode is greater than a first preset threshold value and the voltage signal or current signal of the large particle collecting electrode is less than a second preset threshold value;

generating serious fire detection information if the voltage signal or current signal of the large particle collecting electrode is greater than or equal to the second preset threshold value.

According to a third aspect of the embodiments of the present disclosure, the present disclosure provides an aspirating smoke sensing apparatus for fire detection, including an output module, a communication module, an operation module, a video module, and the aspirating smoke sensing device for fire detection according to any one of the first aspect of the embodiments of the present disclosure;

the output module, the communication module, the operation module, and the video module are connected to the controller of the aspirating smoke sensing device for fire detection, respectively;

the output module is configured to output a fire detection signal outputted from the controller;

the communication module is configured to communicate with an external electronic device;

the operation module is configured for a user to operate the aspirating smoke sensing device for fire detection;

the video module is configured for a user to confirm and check a fire in an area that is prone to generate nuisance smoke, such as a kitchen or a smoking area, and a confirmation and check pattern includes a manual pattern or an automatic pattern.

In the aspirating smoke sensing device, method, and apparatus for fire detection in the present disclosure, a charger, a charge collector, a controller, an air intake structure, and a negative pressure source for air path detection are provided, so that the air intake structure is communicated with the input port of the charger, the output port of the charger is communicated with the charge collector, the charge collector is communicated with the negative pressure source for air path detection, and the controller is electrically connected to the charge collector. The air intake structure is configured to obtain the air sample, and the negative pressure source for air path detection is configured to draw the obtained air sample into the charger. The charger is configured to perform a unipolar charging on the air sample, so as to output the unipolar charged air sample. The charge collector is configured to obtain the unipolar charged air sample, and separate the charged particles with different particle-sizes in the unipolar charged air sample in the negative pressure fluid field and the collecting electric field, so as to obtain the charged particles of different particle-size grades. The controller is configured to determine fire detection information according to the charge quantity corresponding to the charged particles of different particle-size grades.

The beneficial effects of the present disclosure are that:

A stage sensed by the aspirating smoke sensing apparatus for fire detection in the present disclosure is an extremely early stage of pyrolysis, i.e., a stage in which nanoscale particles are released. A great influence is brought to the current market of aspirating smoke sensing apparatuses for fire detection and the fire warning market, and also to the field of a detector for monitoring an electrical fire by measuring pyrolytic particles. The advantages are mainly embodied in term of time (i.e., extremely early stage), and sensitivity (particles with a nano-scale particle-size in a pyrolysis process may be detected), which is particularly suitable for data centers, information exchange machine rooms, high and low voltage electrical cabinets that are explosively increased in the current market, and some important laboratories, etc.

BRIEF DESCRIPTION OF DRAWINGS

The accompanying drawings herein are incorporated in the description and constitute a portion of the description, and illustrate embodiments consistent with the present disclosure, and are used to explain the principle of the present disclosure together with the description.

REFERENCE NUMERALS

Figure 1:
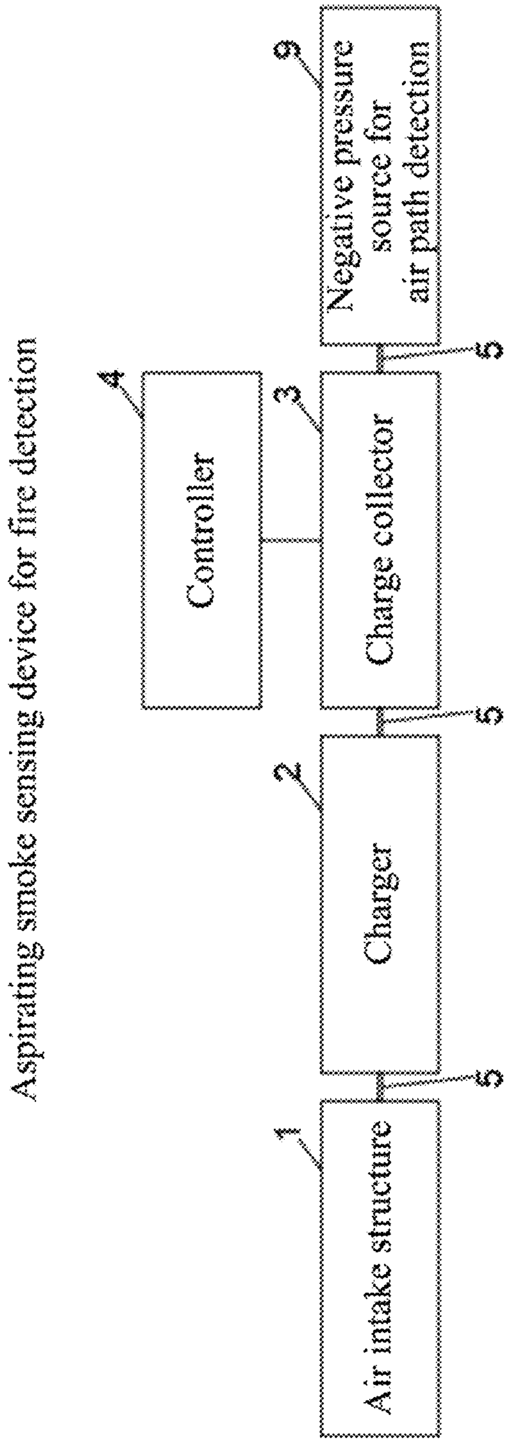
FIG. 1 is a schematic structural diagram of an aspirating smoke sensing device for fire detection according to a first embodiment of the present disclosure.

- 1: air intake structure; 11: air intake hole; 1212: suction pump; 12: air outlet; 13: inlet for air sample to be detected; 14: extra-large particle separator; 15: sampling tube;
- 2: charger; 21: input port of the charger; 211: first input port of the charger; 212: second input port of the charger; 22: high-voltage needle; 23: ground electrode; 24: charging space electric field; 25: collision chamber;
- 3: charge collector; 31: bias electrode; 32: collecting electrode; 321: small particle collecting electrode; 322: large particle collecting electrode; 33: collecting electric field; 34: air jet conduit; 35: negative pressure fluid field; 341: annular narrow jet orifice;
- 4: controller;
- 5: pipeline;
- 6: coagulator; 61: bipolar charging chamber; 62: collisional coagulation chamber; 63: input port; 631: first input port of coagulator; 632: second input port of coagulator; 64: output port;

7: first filter;

8: second filter;

9: negative pressure source for air path detection; 91: negative pressure fan; 92: exhaust port;

10: ultrasonic flow rate monitoring module.

Specific embodiments of the present disclosure have been shown by the drawings, and will be described in more detail below. These drawings and text description are not intended to limit the scope of the conception of the present disclosure in any way, but to illustrate the concept of the present disclosure for those skilled in the art by reference to the specific embodiments.

DESCRIPTION OF EMBODIMENTS

Exemplary embodiments will be described in detail here, examples of which are illustrated in the drawings. When the following description refers to the drawings, unless otherwise indicated, the same number in different drawings represents the same element or similar elements. Implementation manners described in the exemplary embodiments below do not represent all implementation manners consistent with the present disclosure, but are merely examples of devices and methods consistent with some aspects of the present disclosure as detailed in the appended claims.

First, terms to which the present disclosure relates are explained.

Particle charging: the particle charging refers to a process of charging particles in a gas. Charging the particles in the gas is classified into a direct charging and an indirect charging. The direct charging is that the gas directly enters an ion flow formed by a high-voltage electric field to charge the particles. The indirect charging is that the ion flow is led out by a clean air, and is mixed with the gas to be measured in a gas mixing cavity to form the charging on the particles.

Collisional coagulation: the collisional coagulation refers to the coagulation of particles by means of collision, so that a volume of coagulated particles changes. The collisional coagulation is caused by Brownian motions or Coulomb forces among the particles. According to charged conditions of the particles, in a case where at least one of particles to be coagulated is uncharged, the collisional coagulation is a conventional Brownian coagulation. In a case where two particles have opposite charges, the collisional coagulation is a Coulomb force collisional coagulation.

At present, in most fires, especially in an early stage of an electrical fire, a surface temperature of an electronic component is all in a gradual increase. Due to abnormalities, the highest surface temperature of the electronic component may reach above hundreds of degrees. Pyrolytic particles generally begin to spill out when the surface temperature of the electronic component is about 50° C., and the particle at this stage is mainly of below 1 nanometer to several tens of nanometers. When the surface temperature of the substance reaches hundreds of degrees in a later stage, particles with a large particle-size of several hundred nanometers spill out. An ordinary smoke sensing probe may only detect the large particles in the later stage due to the use of an ordinary luminous tube. An aspirating smoke sensing fire detector in the prior art may discover particles with a medium particle-size in middle and later stages of pyrolysis by using a laser detection, which has a slightly higher sensitivity than that of the ordinary smoke sensing probe.

Technical solutions in the present disclosure and how the technical solutions in the present disclosure solve the above technical problem will be described in detail below by specific embodiments. These several specific embodiments below may be combined with each other, and details of the same or similar concepts or processes may not be repeated in some embodiments. The embodiments of the present disclosure will be described below with reference to the accompanying drawings.

FIG. 1 is a schematic structural diagram of an aspirating smoke sensing device for fire detection according to a first embodiment of the present disclosure. As shown in FIG. 1, the aspirating smoke sensing device for fire detection in the present embodiment includes a charger 2, a charge collector 3, a controller 4, an air intake structure 1, and a negative pressure source for air path detection 9. The air intake structure 1 is communicated with an input port of the charger 2. An output port of the charger 2 is communicated with the charge collector 3. An output port of the charge collector 3 is communicated with the negative pressure source for air path detection 9. The controller 4 is electrically connected to the charge collector 3.

The air intake structure 1 is communicated with the input port of the charger 2 through a pipeline 5. The output port of the charger 2 is communicated with the charge collector 3 through the pipeline 5. The output port of the charge collector 3 is communicated with the negative pressure source for air path detection 9. The aspirating smoke sensing device for fire detection is provided in or outside an environment to be monitored, and an air sample in the environment to be monitored enters the device through the air intake structure 1. The air sample in the air intake structure 1 is drawn into the pipeline 5 by a negative pressure generated by the negative pressure source for air path detection 9, and flows through the charger 2 and the charge collector 3 in sequence. The air intake structure 1, the charger 2, the charge collector 3, the negative pressure source for air path detection 9, and the pipelines 5 therebetween constitute a circulating path of the air sample.

The air intake structure 1 is configured to obtain an air sample.

The negative pressure source for air path detection 9 is configured to draw the air sample obtained by the air intake structure 1 into the pipeline 5 for subsequent detection and analysis.

Specifically, the aspirating smoke sensing device for fire detection is provided in or outside an environment in which the fire detection is required. The air intake structure 1 obtains an air sample in the environment to be detected through one or more sampling holes in a sampling pipeline.

A part of the air sample obtained by the air intake structure 1 is drawn into the pipeline 5 by the negative pressure source for air path detection 9.

The charger 2 is configured to perform a unipolar charging on an air sample, and the charging pattern is the indirect charging, so as to output a unipolar charged air sample.

Specifically, the charger 2 has a unipolar space electric field capable of charging particles. The unipolar charging is able to be performed on particles in the air sample through the unipolar space electric field, so that the air sample becomes the unipolar charged air sample. A specific implementation manner of the charger 2 will be introduced in detail in subsequent embodiments.

Optionally, the charger 2 is a positive-charge charger, and the charger is specifically configured to:

obtain the air sample transmitted by the air intake structure;

positively charge the particles in the air sample, so as to obtain a unipolar charged air sample with positively charged particles.

Specifically, the space electric field in the charger 2 discharges and generates a flow of positive ions, which makes the positive ions adhere to the particles in the air sample to form the positively charged particles, so that the air sample becomes the unipolar charged air sample.

In the device of the present embodiment, since an environment is filled with more negatively charged ions, which affect the charging process in the charger, the positive-charge charger with a high concentration is provided to counteract the negatively charged ions in the air, which may reduce the influence of an external electromagnetic environment on the charging process and improve the accuracy of the fire detection.

Optionally, the charger 2 may also be a negative-charge charger, and the charger is specifically configured to:

obtain the air sample in the air intake structure;

negatively charge the particles in the air sample, so as to obtain a unipolar charged air sample with negatively charged particles.

The charge collector 3 is configured to obtain the unipolar charged air sample, and separate charged particles with different particle-sizes in the unipolar charged air sample, so as to obtain charged particles of different particle-size grades.

Specifically, a negative pressure fluid field and a deflection electric field are provided inside the charge collector 3. The negative pressure fluid field provides forward kinetic energy for particles entering the electric field. The polarity of a deflection electrode in the deflection electric field is opposite to that of the charged particles in the air sample outputted from the unipolar charger, which is able to deflect a moving trajectory of the charged particles that enter the charge collector 3 and move forward stably. The unipolar charged air sample contains the charged particles with different particle-sizes and different unipolar charge quantities. Therefore, when the charged particles move forward and deflect in the deflection electric field inside the charge collector 3, the charged particles with different particle-sizes generate different deflection trajectories, so that the charged particles with different particle-sizes may be differentiated, so as to obtain the charged particles of different particle-size grades. The controller 4 is configured to determine fire detection information according to charge quantities corresponding to the charged particles of different particle-size grades.

After the charged particles with different particle-sizes are differentiated, the charged particles of different particle-size grades are obtained, and thus charge quantity of charged particles of the same particle-size grade may be obtained. For the differentiated groups of charged particles, obtaining charge quantity of a certain group of charged particles is the prior art in the field, which will not be repeated here. Charge quantity that charged particles of a certain particle-size grade have is related to the number of the charged particles of such particle-size grade. That is, the more the charged particles of the particle-size grade, the more the charge quantity. Therefore, the charge quantity of the charged particles of such particle-size grade may reflect the number of the charged particles of such particle-size grade, and a current stage of fire development may be evaluated through the number of the charged particles of such particle-size grade. For example, in an early stage of fire, the number of particles with a small particle-size is relatively large, and in a later stage in which the fire is more serious, the number of particles with a large particle-size is relatively large. Therefore, the controller 4 may determine the fire detection information according to the charge quantity corresponding to the charged particles of different particle-size grades. In the present embodiment, the charger 2, the charge collector 3, the controller 4, the air intake structure 1, and the negative pressure source for air path detection 9 are provided, so that the air intake structure 1 is communicated with the input port of the charger 2, the output port of the charger 2 is communicated with the charge collector 3, the charge collector 3 is communicated with the negative pressure source for air path detection 9, and the controller 4 is electrically connected to the charge collector 3. The air intake structure is configured to obtain an air sample, and the negative pressure source for air path detection 9 is configured to draw a part of the air sample obtained by the air intake structure 1 into the pipeline 5 and send the part of the air sample to following processes for detection. The charger 2 is configured to perform the unipolar charging on the air sample, so as to output the unipolar charged air sample. The charge collector 3 is configured to obtain the unipolar charged air sample, and separate the charged particles with different particle-sizes in the unipolar charged air sample, so as to obtain the charged particles of different particle-size grades. The controller 4 is configured to determine the fire detection information according to the charge quantity corresponding to the charged particles of different particle-size grades.

The controller 4 performs an airflow monitoring on the entire air path detection through an ultrasonic flow rate monitoring module 10, and sends parameters to the negative pressure source for air path detection 9, so as to adjust the negative pressure and flow in the charger 2, the charge collector 3 and the pipelines therebetween.

Since the particles with different particle-sizes in the ambient air may reflect the current stage of the fire, for example, for the early stage of the fire, major particles with a small particle-size are present in the air sample, the particles with different particle-sizes are charged and separated, and the numbers of the particles of different particle-size grades in the environment are determined according to the charge quantities of the charged particles of different particle-size grades, and thus a fire status in the environment is determined, so as to discover an early fire hazard in time.

Figure 2:
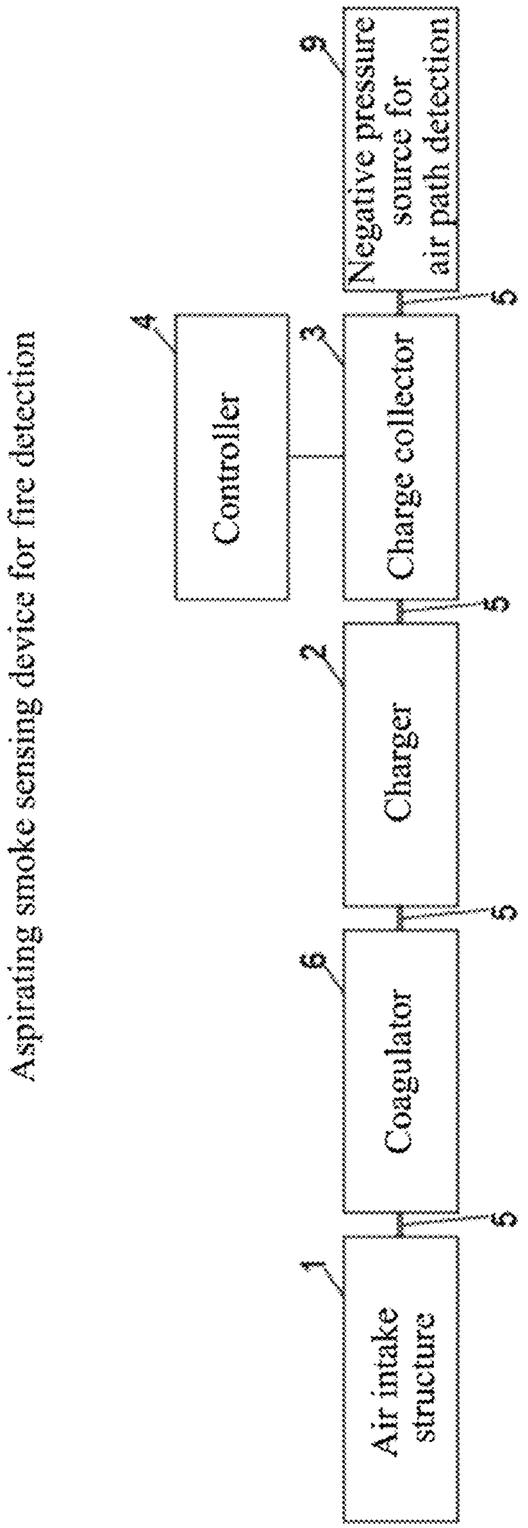
FIG. 2 is a schematic structural diagram of an aspirating smoke sensing device for fire detection according to a second embodiment of the present disclosure.

FIG. 2 is a schematic structural diagram of an aspirating smoke sensing device for fire detection according a second embodiment of the present disclosure. As shown in FIG. 2, the aspirating smoke sensing device for fire detection in the present embodiment is refined and expanded on a basis of the aspirating smoke sensing device for fire detection in the embodiment shown in FIG. 1.

The aspirating smoke sensing device for fire detection in the present embodiment further includes a coagulator 6. An input port of the coagulator 6 is communicated with the air intake structure 1, and an output port of the coagulator 6 is communicated with the charger 2.

The coagulator 6 is disposed on an air sample circulating path of the air intake structure 1 and the charger 2. After entering the aspirating smoke sensing device for fire detection through the air intake structure 1, the air sample is first subjected to a pre-treatment by the coagulator 6, and then enters the charger 2 for charging.

Specifically, the coagulator 6 is configured to perform collisional coagulation on an air sample, so as to coagulate micro particle-size particles and small particle-size particles in the air sample into large particle-size particles.

When the particle-size of the particle in the air sample is relatively small, charging the particle in the air sample has a problem of a low charging efficiency, so that charge quantity of the micro particle-size particle and the small particle-size particle is too small, thereby resulting in an inaccurate detection of the micro particle-size particles and the small particle-size particles due to a low detection sensitivity to particles with a smaller particle-size in the air sample.

A total charge quantity of particles in a certain particle-size range is in direct proportional to surface area thereof. Particles in a small particle-size range have a small surface area of single particle but a large number, and the total surface area thereof will be relatively large. Particles in a large particle-size range are in a relatively small number, but have a large surface area of single particle. Therefore, in a case where the charging efficiency is constant, charge quantities in the large and small particle-size ranges are basically consistent. Therefore, the sensitivity of the detection device may be kept consistent for the particles in each particle-size range. For a large number of particles with a particle-size below 2 nm that are decomposed at a low temperature in an ultra-early stage, due to their small volumes and the extremely low charging efficiency, the pre-treatment of collisional coagulation is adopted, and the coagulated and grown particles are recharged, which may effectively detect the particles in this micro particle-size range, and increase a micro and small particle-size detection range significantly.

In the present embodiment, the collisional coagulation is performed on the inputted air sample by the setting of the coagulator 6, so as to coagulate the micro particle-size particles and the small particle-size particles in the air sample into the large particle-size particles, which improves the charging efficiency of performing the unipolar charging subsequently on the micro particle-size particles and small particle-size particles in the air sample, and improves detection effects of the micro particle-size particles and small particle-size particles.

Optionally, the coagulator 6 is specifically configured to:

perform a bipolar charging on an air sample, so as to obtain a bipolar charged air sample;

perform the collisional coagulation on the bipolar charged air sample, so as to increase the particle-sizes of the particles in the air sample.

Bipolar charging means simultaneously charging the air sample through two opposite electrodes. That is, a large number of positive and negative ions exist in air at the same time, so that the particles in the air sample have different charge attributes. When the collisional coagulation is performed on the bipolar charged air sample, since the charged particles in the bipolar charged air sample have different charge attributes, the probability of the Coulomb force collisional coagulation among the particles is increased compared to particles with a single charge attribute, and the effect of collisional coagulation of the micro particle-size particles and the small particle-size particles in the air sample is improved. It is particularly pointed out that in the bipolar charging, since concentrations of the positive and negative ions are large and the positive and negative ions have a space retention for a longer time, the micro particle-size particles have a great probability of capturing the unipolar (either positive or negative) ions, and thus get bigger due to Coulomb force attraction among the particles which is caused by differences in electrical polarity. The enlarged particles are recharged by the unipolar ions, and then are attracted with other particles with ions of an opposite polarity and grown up. As the particles grow larger, a probability that the grown single particle captures both the positive ions and the negative ions at the same time increases. At this time, charges of the positive and negative ions of the particle itself are offset, so that the particle is uncharged, and the Coulomb force attraction is zero. That is, the particle does not grow up any more. Therefore, the effective and rapid growth in the coagulator 6 is mainly for the micro particle-size particles and part of the small particle-size particles, and the growth of part of the small particle-size particles and the large particle-size particles is not obvious.

The particles in the air sample include the micro particle-size particles, the small particle-size particles, and large particle-size particles.

Optionally, the micro particle-size particles correspond to particles with a particle-size below 2 nanometers, the small particle-size particles correspond to particles with a particle-size of 2 nanometers to 150 nanometers, and the large particle-size particles correspond to particles with a particle-size of greater than 150 nanometers. It is particularly noted that, the classification of particle types here is a schematic classification relative to a detection range of an optical smoke sensing fire detector. The optical smoke sensing fire detector may be used to only detect the large particle-size particles, i.e., the particles with particle size above 150 nanometers, and cannot detect the micro particle-size particles and the small particle-size particles. The aspirating smoke sensing device for fire detection in the present embodiment may coagulate and make the particles with the particle-size below 2 nm or of a few nanometers grow into particles of tens of nanometers by providing the coagulator, which significantly improves the detection range of particles, and thus the early fire is able to be warned more timely.

The controller 4 may also determine a cleanliness class of a monitored environment according to received signals, such as a one hundred thousand-class (ISO Class 8), a ten thousand-class (ISO Class 7), a thousand-class (ISO Class 6) clean room, etc., and set different sensitivities according to different classes.

Specifically, for example, a factory sensitivity of an apparatus is set according to default monitoring requirements for an ordinary environment. A concentration of particles in air in the ordinary environment is tens of thousands per cubic centimeter, a sensitivity in this ordinary environment is set accordingly. If the monitored air sample is from a clean room, according to the received signals, the controller determines that a concentration of particles in air in the monitored environment is about a few per cubic centimeter, which belongs to the thousand-class clean room. The detector may automatically or manually correct the sensitivity to an ultra-high sensitivity setting corresponding to the thousand-class clean room in the current environment. This can not only discover the fire hazard of the clean room, but also monitor an air cleanliness of the clean room in a large area. At present, for monitoring a cleanliness quality of the thousand-class clean room, the ten thousand-class clean room, or a local clean bench or equipment of above hundred-class, a 0.3 μm dust particle counter is used to perform an irregular manual measurement of key places. In the present method and apparatus, a single apparatus may set dozens to hundreds of sampling points for the air sample. One sampling point corresponds to one protection area or protection object, and a total protection area may reach 2000 square meters, thus covering the entire clean area or a plurality of local clean benches in a large area.

Therefore, the aspirating smoke sensing device for fire detection including a coagulator in the second embodiment may be recommended for use in such places with a higher cleanliness.

The current 0.3 μm dust particle counter applies the principle of laser detection, which also cannot sense particles of tens of nanometers. However, the present device may detect particles of several nanometers, and may more effectively prevent large area products from being scrapped due to pollution of the clean room.

Figure 3:
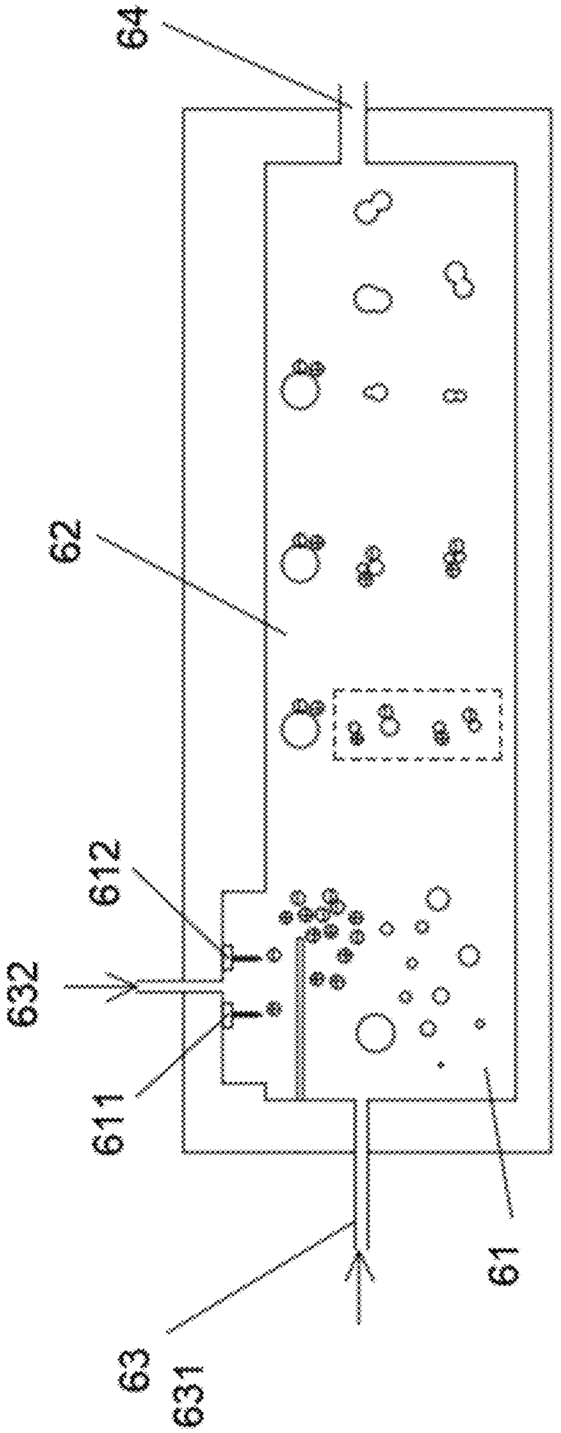
FIG. 3 is a schematic diagram showing an optional structure of a coagulator in the aspirating smoke sensing device for fire detection according to the second embodiment of the present disclosure.

FIG. 3 is a schematic diagram showing an optional structure of a coagulator in the aspirating smoke sensing device for fire detection according to the second embodiment of the present disclosure.

As shown in FIG. 3, the coagulator includes a bipolar charging chamber 61 and a collisional coagulation chamber 62. A positive electrode charging needle 611 and a negative electrode charging needle 612 are provided inside the bipolar charging chamber 61. The positive electrode charging needle 611 and the negative electrode charging needle 612 are able to release positive ions and negative ions of an equal amount correspondingly, so as to form an ion cloud. The air sample enters the bipolar charging chamber 61 from the input port 63 of the coagulator, and 631 is a first filtered air sample, and 632 is a second filtered air sample. The second filtered air sample 632 blows across surfaces of the positive electrode charging needle 611 and the negative electrode charging needle 612 and cleans the surfaces, and at the same time, blows the positive and negative ions into the bipolar charging chamber 61. The positive and negative ions then enters the collisional coagulation chamber 62 after being mixed with the first filtered air sample. In this case, the particles in the air sample are positively charged, negatively charged, or uncharged. Under the role of the Coulomb forces among the particles with different charges, the particles in the air sample are subjected to the Coulomb force collisional coagulation to form particles with a larger particle-size, which are discharged from the output port 64 of the coagulator.

Optionally, in order to further improve the coagulation effect of the small particle-size particles, the volume of the collisional coagulation chamber 62 has a specific proportional relationship with the flow of the air sample in the coagulator.

Specifically, after being charged in the bipolar charging chamber 61 of the coagulator, the particles in the air sample are subjected to the collisional coagulation for many times in the collisional coagulation chamber 62 of the coagulator, so as to make the small particle-size particles coagulate and enlarge gradually. Therefore, the enlarged level of particles is related to the duration for the particles to collide and coagulate in the collisional coagulation chamber 62. An increase in the duration for the particles to collide and coagulate in the collisional coagulation chamber 62 may improve the effects of the collisional coagulation of the particles in the air sample. Thus, in a case where a proportional relationship between the volume of the collisional coagulation chamber 62 and the flow of the air sample entering the coagulator is within a specific range, the coagulation effect of the small particle-size particles is able to be improved.

Optionally, the ratio of the volume of the collisional coagulation chamber 62 to the flow of the air sample entering the coagulator is 10 to 180, that is, the duration of the air sample in the coagulator is between 10 seconds and 180 seconds.

Figure 4:
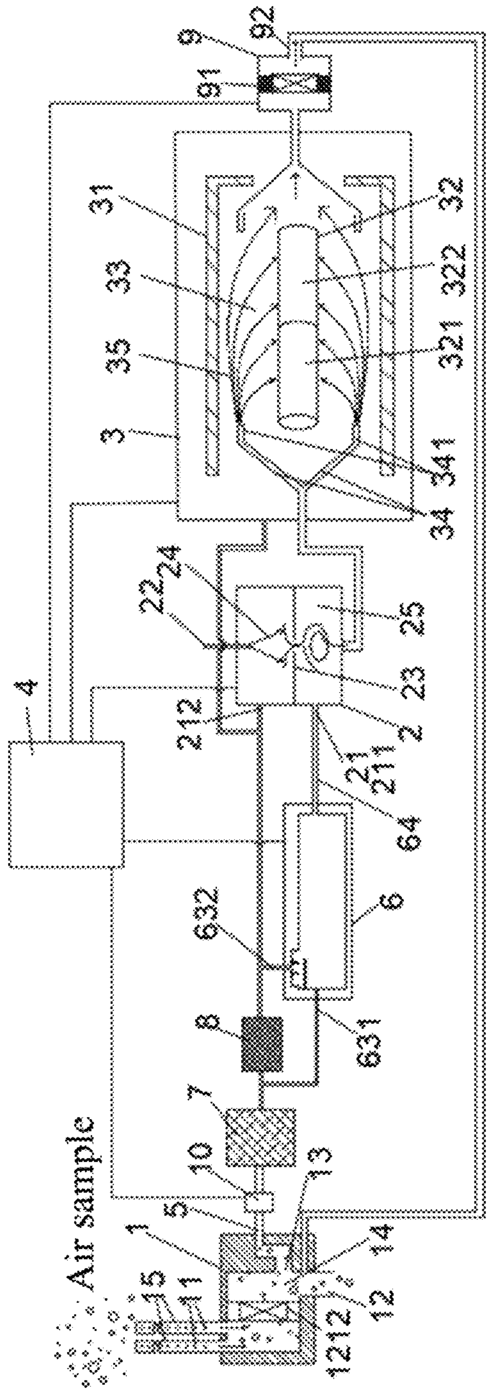
FIG. 4 is a schematic diagram showing a detailed structure of an aspirating smoke sensing device for fire detection according to a third embodiment of the present disclosure.

FIG. 4 is a schematic structural diagram of an aspirating smoke sensing device for fire detection according to a third embodiment of the present disclosure. As shown in FIG. 4, the aspirating smoke sensing device for fire detection in the present embodiment is refined and expanded on a basis of the aspirating smoke sensing device for fire detection in the embodiment shown in FIG. 2.

The aspirating smoke sensing device for fire detection in the present embodiment further includes a first filter 7 and a second filter 8. An input port of the first filter 7 is communicated with the air intake structure 1, and an output port of the first filter 7 is communicated with an input port of the second filter 8 and the input port 63 of the coagulator 6, respectively. An output port of the second filter is communicated with another input port 63 of the coagulator 6.

A filtering material of the first filter 7 has a larger gap than a filtering material of the second filter 8.

The first filter 7 is configured to filter the air sample, so as to obtain a first filtered air sample.

The second filter 8 is configured to filter the first filtered air sample, so as to obtain a second filtered air sample that is a clean air.

Optionally, the first filter 7 is a primary filter for filtering impurities and foreign matters in the air sample that are not related to the fire detection, so as to prevent electronic components inside the aspirating smoke sensing device for fire detection from being damaged after the foreign matters and the impurities entering thereto, reduce maintenance costs of the aspirating smoke sensing device for fire detection, and increase its service life.

Optionally, the second filter 8 is a fine filter for re-filtering the first filtered air sample filtered by the primary filter, so as to obtain the second filtered air sample. The second filtered air sample is the clean air that does not contain particles for fire detection and only includes the air medium itself.

Optionally, the first filter 7 and the second filter 8 may consist of a plurality of sub-filters per se. Moreover, other filters may be disposed between the first filter 7 and the second filter 8 as needed, so as to form an air sample containing specific particle components for specific fire detection. Here, specific implementation manners of the first filter 7 and the second filter 8 are not limited.

Correspondingly, the performing, by the coagulator 6, the collisional coagulation on the air sample to increase the particle-sizes of the particles in the air sample, is specifically configured to:

mix the first filtered air sample and the second filtered air sample, so as to obtain a mixed gas sample with a preset particle concentration.

The second filtered air sample is the clean air, and purges the charging needles 611 and 612 in the coagulator 6, so as to increase the service lives of the charging needles 611 and 612.

Specifically, the input ports 63 of the coagulator include a first input port 631 of the coagulator and a second input port 632 of the coagulator, and the first input port 631 of the coagulator is communicated with the output port of the first filter 7. The coagulator 6 receives the first filtered air sample filtered and outputted by the first filter 7 through the first input port 631 of the coagulator, that is, larger particles and some impurities in the air sample are removed, so as to prevent the impurities and the foreign matters in the air sample that are irrelevant to the fire detection from entering the apparatus and affecting the normal performance of the apparatus. Then, particles in the first filtered air sample are subjected to the collisional coagulation inside the coagulator

6. The second input port 632 of the coagulator is communicated with the output port of the second filter 8. The coagulator 6 receives the second filtered air sample (i.e., the clean air) filtered and outputted by the second filter 8 through the second input port 632 of the coagulator, which serves to purge and protect the charging needles while blowing out positive and negative ions into the bipolar charging chamber 61.

Optionally, the output port of the second filter 8 may further be communicated with the charge collector 3, for introducing the clean air into the charge collector 3, adjusting a particle concentration in the charge collector 3, protecting insulators on the fixed terminals at two terminals of the charge collector, and improving the grading effect of the charged particles with different particle-sizes in the collector. Optionally, the output port of the second filter 8 may further be connected to the charger 2, so as to purge and protect a high-voltage needle 22.

Optionally, the air intake structure 1 may include one or more air intake pipes 15 and one or more air intake holes 11 in the pipe, and is configured with an air outlet 12, an inlet for air sample to be detected 13, and an extra-large particle separation structure 14 therein. The inlet for air sample to be detected 13 is communicated with the charger 2 through a pipe. An air sample enters the air intake pipe(s) 15 from the air intake hole(s) 11 and reaches the inside of the air intake structure 1, and passes through the extra-large particle separation structure 14 which is mainly used to remove extra-large particles in air. A large part of the air sample from which the extra-large particles have been removed is discharged from the air outlet 12, and another part is drawn into the pipeline 5 from the inlet for air sample to be detected 13 at a slightly positive pressure by the negative pressure source for air path detection 9, then passes through the ultrasonic flow rate monitoring module 10, and enters the charger 2 through the air sample circulating path, so as to perform the subsequent charging process.

Optionally, the air intake structure 1 further includes a suction pump 1212, which is disposed at the air intake pipe 15 of the air intake structure 1. By providing the suction pump 1212, the air sample in the environment may quickly enter the inside of the aspirating smoke sensing device for fire detection, thus improving the detection efficiency.

The negative pressure source for air path detection 9 further includes a negative pressure fan 91 and an exhaust port 92. The negative pressure fan 91 is configured to form an airflow model of low negative pressure in the charger 2, the charge collector 3, and the entire detection and analysis pipeline. The airflow model is controlled by a controller 4. The exhaust port 92 is communicated with the air outlet 12 of the air intake structure 1, so that a gas discharged from the negative pressure fan 91 and an unnecessary air sample gas from the air outlet 12 are combined and discharged.

A negative pressure generated by this negative pressure fan is about several hundred Pa. At present, a continuous operating life of this type of fan may reach above 100,000 hours, which may fully meet the requirements of long-term work for fire-fighting products.

Optionally, the suction pump 1212 and the negative pressure fan 91 are electrically connected to the controller 4, and the ultrasonic flow rate monitoring module 10 is electrically connected to the controller 4. In order to avoid measurement errors during a temperature changing process, the ultrasonic flow rate monitoring module 10 abandons a traditional pattern considering an amplitude of a measurement signal as an index, and adopts a phase discrimination pattern, which accurately measures a time difference between a phase of an ultrasonic transmitter waveform and a phase of an ultrasonic receiver waveform, and transforms the time difference into an accurate flow rate and flow. The controller 4 outputs a signal to control a rotation speed of the negative pressure fan 91 according to received parameter values of the ultrasonic flow rate monitoring module 10, so as to stabilize a negative pressure value and flow of a negative pressure fluid field 35, and form a stable airflow model. Thus, a stable airflow is formed in the charger 2, the charge collector 3, and an annular narrow jet orifice 341.

The controller 4 sends control instructions to the suction pump 1212 at preset time intervals, which includes: continuously regulating the speed of the suction pump, controlling the suction pump 1212 to draw the air sample in the ambient environment into the air intake structure 1, controlling the airflow and negative pressure in the negative pressure fluid field 35 by controlling the rotation speed of the negative pressure fan 91, and drawing the air sample obtained by the air intake structure 1 into the pipeline 5 for subsequent detection, so as to realize a continuous monitoring of a fire in the environment.

Optionally, a high-voltage needle 22 and a ground electrode 23 are provided in the charger 2. The high-voltage needle 22 is provided with a unipolar direct current high-voltage electricity. The high-voltage needle 22 and the ground electrode 23 form a charging space electric field 24, and the charging space electric field 24 discharges to generate a unipolar ion flow, for example, a positive ion flow. The charger 2 further includes a collision chamber 25 therein. The air sample and the unipolar ion flow entering the charger 2 collide and mix in the collision chamber, and the unipolar ions attach to the large and small particles in the air sample, so as to achieve the indirect charging on the particles by collision, and make the air sample become the unipolar charged air sample.

Optionally, the input port 21 of the charger includes a first input port 211 of the charger and a second input port 212 of the charger. The first input port 211 of the charger is communicated with the output port 64 of the coagulator 6. The second input port 212 of the charger is communicated with the output port of the second filter 8. The second input port 212 of the charger is configured to receive the second filtered air sample (i.e., the clean air) outputted from the second filter 8, and the second filtered air sample is configured to blow away and carry the unipolar ion flow generated in the charging space electric field 24 to enter the collision chamber of the charger 2 from a center hole of the ground electrode 23, so that the unipolar ion flow and the air sample are collided for charging in the collision chamber. Meanwhile, the clean air also protects the electrode needles from contamination.

Optionally, the coagulator 6 is electrically connected to the controller 4. The controller 4 adjusts flows of the coagulator 6 at the first input port of the coagulator 6 and the second input port of the coagulator 6, so as to achieve the purpose of adjusting the particle concentration inside the coagulator 6.

The collisional coagulation is performed on the mixed gas sample, so as to increase the particle-sizes of the particles in the air sample.

Optionally, the charge collector 3 includes a bias electrode 31, a collecting electrode 32, and a collecting electric field 33 formed by the bias electrode 31 and the collecting electrode 32.

A direct current voltage is connected to the bias electrode 31, and the polarity of the direct current voltage is opposite to that of the charged particles in the unipolar charged air sample. The collecting electric field 33 formed by the bias electrode 31 and the collecting electrode 32 deflects the charged particles in the unipolar charged air sample towards the collecting electrode 32. Optionally, the bias electrode 31 is of a tubular structure, the collecting electrode 32 is of a tubular structure, and the collecting electrode 32 is disposed on the axis inside the tubular structure of the bias electrode 31.

An air jet conduit 34 and a negative pressure fluid field 35 are provided in the charge collector 3. One end of the air jet conduit 34 is communicated with the output port of the charger 2 through the input port of the charge collector 3, and the other end thereof is the annular narrow jet orifice 341 located in the collecting electric field 33 between the bias electrode 31 and the collecting electrode 32. The negative pressure fluid field 35 is a stable airflow model of negative pressure formed by the negative pressure source for air path detection 9 and the long and narrow airflow channel inside the charge collector 3. The model draws the charged particles out of the output port of the charger, and the charged particles eject from the annular narrow jet orifice 341 through the conduit 34. The charged particles in the unipolar charged air sample ejecting and moving forward along the long and narrow airflow channel deflect under an action of the collecting electric field 33, and gradually fall onto the collecting electrode 32. Due to the different particle-sizes of the charged particles, the masses thereof are different, which further results in different kinetic energies of the charged particles when they are ejecting from the annular narrow jet orifice 341. Therefore, charged particles with larger kinetic energy have a longer flight distance, and charged particles with smaller kinetic energy have a shorter flight distance. Optionally, the collecting electrode 32 has a plurality of sub-collecting electrodes, which are respectively arranged in sequence along an axial direction of the bias electrode 31. The charged particles with different particle-sizes eventually fall onto different sub-collecting electrodes.

Optionally, the charge collector 3 is further specifically configured to:

receive a control parameter sent by the controller 4;

adjust a voltage of the bias electrode 31 according to the control parameter, so that the charged particles with different particle-sizes in the unipolar charged air sample fall onto the collecting electrodes 32 corresponding to particle-size grades of the charged particles. Specifically, the voltage of the bias electrode 31 is adjusted through the control parameter sent by the controller 4, so that the charged particles with different kinetic energies due to different particle-sizes deflect and fall onto the collecting electrodes 32 corresponding to the particle-size grades of the charged particles, so as to distinguish the charged particles with different particle-sizes.

Optionally, for particles with excessive kinetic energy in the unipolar charged air sample, such as large dust particles and other large particle-size particles that are not related to fire, such particles cannot fall onto the collecting electrodes 32 under the action of the collecting electric field 33 due to excessive kinetic energy, thereby excluding a false alarm of fire caused by interference particles such as the dust, and improving the accuracy of the fire detection.

Optionally, the collecting electrode 32 includes a large particle collecting electrode 322 and a small particle collecting electrode 321. The controller 4 is specifically configured to:

obtain voltage signals or current signals formed by charge quantity corresponding to charged particles in the large particle collecting electrode 322 and the small particle collecting electrode 321.

The large particle collecting electrode 322 is configured to collect larger particle-size particles, and the small particle collecting electrode 321 is configured to collect smaller particle-size particles. Specifically, both the large particle collecting electrode 322 and the small particle collecting electrode 321 are arranged on the axis inside the bias electrode 31, and the small particle collecting electrode 321 is closer to the annular narrow jet orifice 341. The smaller particle-size charged particles ejecting from the annular narrow jet orifice 341 fall quickly due to their smaller forward kinetic energy, and are collected by the small particle collecting electrode 321. The large particle collecting electrode 322 is far away from the annular narrow jet orifice 341. The larger particle-size charged particles ejecting from the annular narrow jet orifice 341 have a gradual deflection angle in the collecting electric field 33 due to their greater forward kinetic energy, resulting in a longer flight distance, and thus are collected by the large particle collecting electrode 322. The small particle collecting electrode 321 and the large particle collecting electrode 322 respectively obtain the charges of the charged particles after collecting the charged particles. Corresponding voltage signals or current signals are formed according to the charge quantity. A method of obtaining voltage values and current values according to charge quantity is the prior art, which will not be repeated here.

According to the voltage signal(s) or the current signal(s) of the large particle collecting electrode 322 and/or the small particle collecting electrode 321, the corresponding fire detection information is determined.

Specifically, the voltage signals or the current signals of the large particle collecting electrode 322 and the small particle collecting electrode 321 are respectively related to the number of the large particle-size particles and the number of the small particle-size particles. According to the number of the large particle-size particles and the number of the small particle-size particles, the stage of development of the fire in the environment may be judged. Therefore, according to the voltage signal(s) or the current signal(s) of the large particle collecting electrode 322 and/or the small particle collecting electrode 321, the corresponding fire detection information may be determined.

Optionally, if the voltage signal or the current signal of the small particle collecting electrode 321 is greater than a first preset threshold value, and the voltage signal or the current signal of the large particle collecting electrode 322 is less than a second preset threshold value, early fire detection information is generated. If the voltage signal or the current signal of the large particle collecting electrode 322 is greater than or equal to the second preset threshold value, serious fire detection information is generated.

The first preset threshold value and the second preset threshold value are specifically set according to environmental conditions of fire monitoring. For example, in a complex environment with large temperature changes and serious air pollution, such as a production workshop or a smelting plant, the first preset threshold value and the second preset threshold value are relatively higher, so as to prevent false alarms. In a clean and weak current place such as an IT machine room or a data center, the first preset threshold value and the second preset threshold value are relatively lower, so as to improve the sensitivity of the fire detection.

Optionally, the collecting electrode 32 may include a plurality of sub-collecting electrodes. Under the control of the controller, the plurality of sub-collecting electrodes collect particles with different particle-sizes correspondingly, so as to realize a specific type of fire detection, a realization principle of which is similar to the above principle of obtaining charged particles through the large particle collecting electrode 322 and the small particle collecting electrode 321 to perform the fire detection, which will not be repeated here.

Since the laser aspirating smoke sensing apparatus for fire detection in the prior art cannot detect the smoke particles with the particle-size of less than 150 nm generated by pyrolysis or smoldering in the early stage of the fire, it is impossible to realize a true early warning. Moreover, the cloud chamber aspirating smoke sensing apparatus for fire detection cannot detect the particles with the particle-size below 2 nm generated in the fire due to the nucleation principle, and is also not sensitive to the large particle-size smoke particles with the particle-size above several hundred nanometers generated in the fire. Therefore, the prior art cannot sense particles in all particle-size ranges.

In the present embodiment, the particles generated in the fire may be sensed in all particle-size ranges from the particle-size below 2 nm to a few microns through the aspirating smoke sensing device fire detection, so as to achieve the purposes of the early warning and the reliable fire monitoring in all particle-size ranges.

Figure 5:
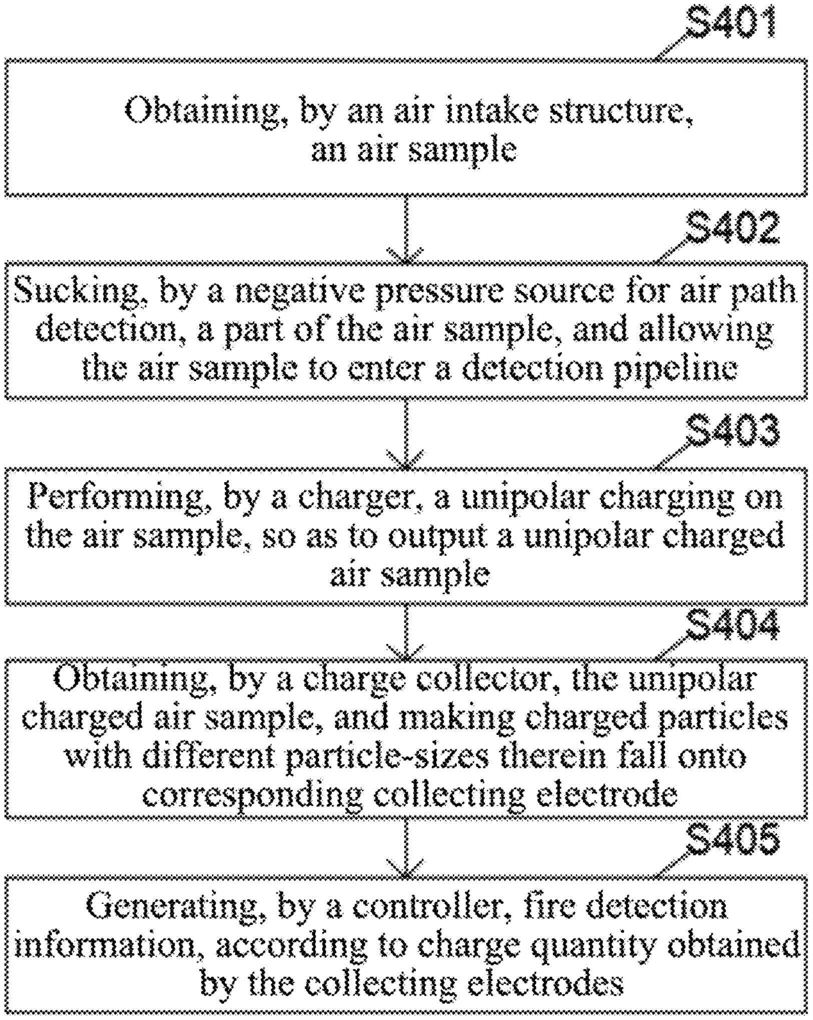
FIG. 5 is a flow chart of an aspirating smoke sensing method for fire detection according to a fourth embodiment of the present disclosure.

FIG. 5 is a flow chart of an aspirating smoke sensing method for fire detection according to a fourth embodiment of the present disclosure, which is applied to the aspirating smoke sensing device for fire detection as shown in FIG. 1. As shown in FIG. 5, the aspirating smoke sensing method for fire detection in the present embodiment includes following steps:

S401, obtaining, by the air intake structure, an air sample.

S402, drawing, by the negative pressure source for air path detection, a part of the air sample, and allowing the air sample to enter the detection pipelines.

S403, performing, by the charger, a unipolar charging on the air sample, so as to output a unipolar charged air sample.

S404, obtaining, by the charge collector, the unipolar charged air sample, and making charged particles with different particle-sizes in the unipolar charged air sample fall onto corresponding collecting electrodes.

S405, generating, by the controller, fire detection information, according to charge quantity obtained by the collecting electrodes.

Specific implementation methods of respective steps in the present method embodiment are the same as the implementation schemes in the aspirating smoke sensing device for fire detection shown in FIG. 1, which will not be repeated here.

Figure 6:
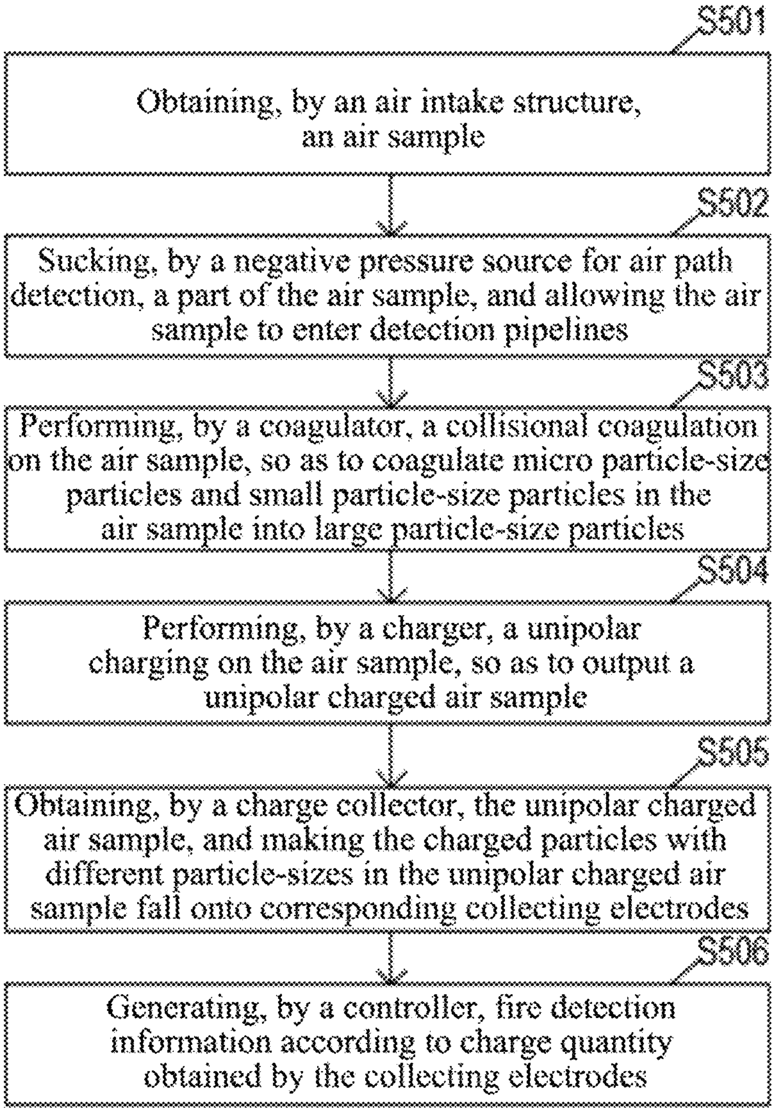
FIG. 6 is a flow chart of an aspirating smoke sensing method for fire detection according to a fifth embodiment of the present disclosure.

FIG. 6 is a flow chart of an aspirating smoke sensing method for fire detection according to a fifth embodiment of the present disclosure, which is applied to the aspirating smoke sensing device for fire detection as shown in FIG. 2. As shown in FIG. 6, in the aspirating smoke sensing method for fire detection in the present embodiment, a process of collisional coagulation on the air sample is introduced before S403 based on the aspirating smoke sensing method for fire detection shown in FIG. 5. The method specifically includes following steps.

S501, obtaining, by the intake structure, an air sample.

S502, drawing, by the negative pressure source for air path detection, a part of the air sample, and allowing the air sample to enter the detection pipelines.

S503, performing, by the coagulator, a collisional coagulation on the air sample, so as to coagulate micro particle-size particles and small particle-size particles in the air sample into large particle-size particles.

Figure 7:
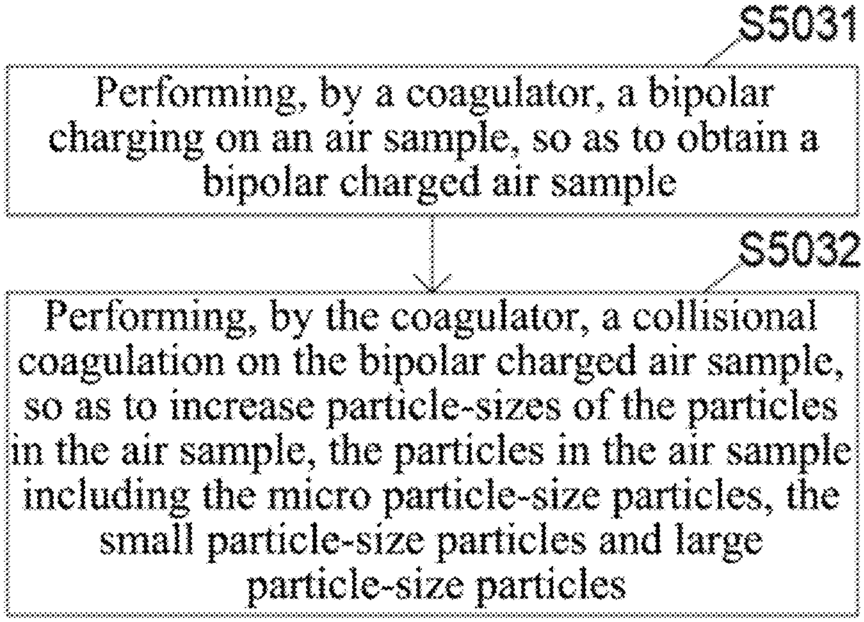
FIG. 7 is a flow chart of S503 in the embodiment shown in FIG. 6.

Optionally, as shown in FIG. 7, S503 includes two specific implementation steps, i.e., S5031 and S5032.

S5031, performing, by the coagulator, a bipolar charging on the air sample, so as to obtain a bipolar charged air sample.

S5032, performing, by the coagulator, a collisional coagulation on the bipolar charged air sample, so as to increase particle-sizes of the particles in the air sample. The particles in the air sample include the micro particle-size particles, the small particle-size particles, and large particle-size particles.

S504, performing, by the charger, a unipolar charging on the air sample, so as to output a unipolar charged air sample.

S505, obtaining, by the charge collector, the unipolar charged air sample, and making the charged particles with different particle-sizes in the unipolar charged air sample fall onto corresponding collecting electrodes.

S506, generating, by the controller, fire detection information according to charge quantity obtained by the collecting electrodes.

Specific implementation methods of respective steps in the present method embodiment are the same as the implementation schemes in the aspirating smoke sensing device for fire detection shown in FIG. 2, which will not be repeated here.

Figure 8:
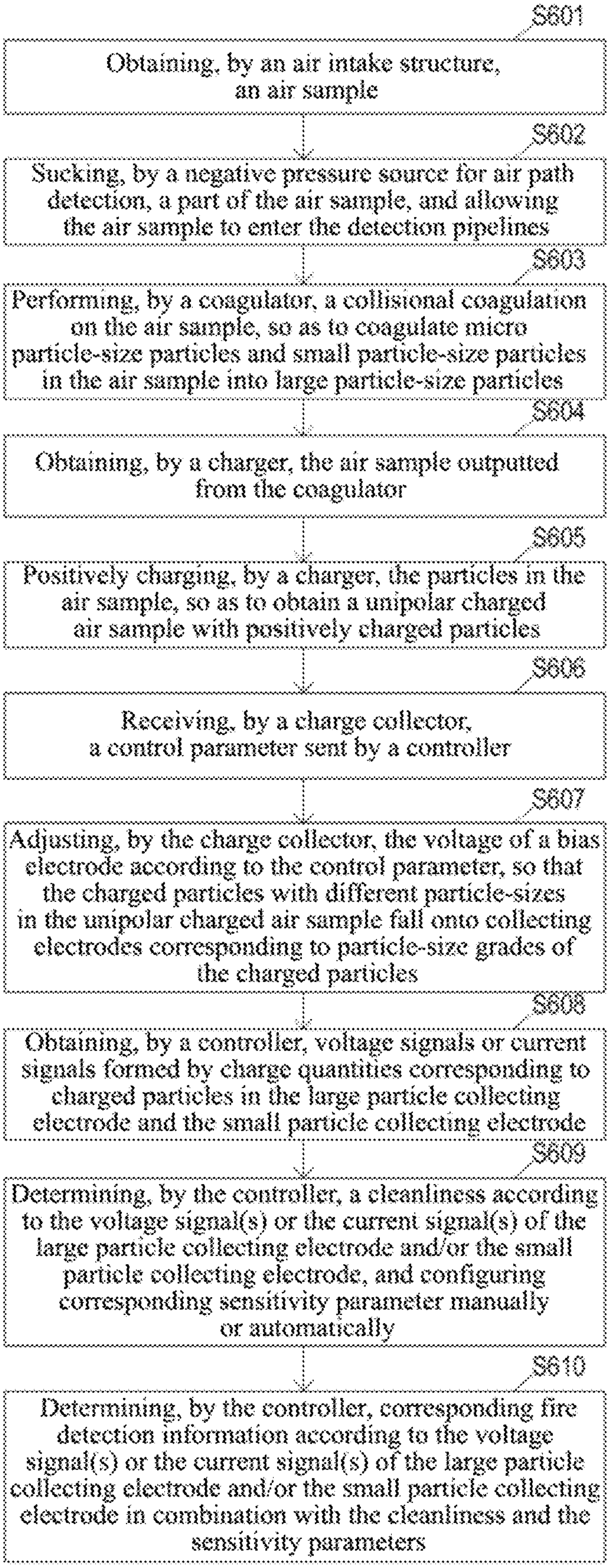
FIG. 8 is a flow chart of an aspirating smoke sensing method for fire detection according to a sixth embodiment of the present disclosure.

FIG. 8 is a flow chart of an aspirating smoke sensing method for fire detection according to a sixth embodiment of the present disclosure, which is applied to the aspirating smoke sensing device for fire detection as shown in FIG. 4. As shown in FIG. 8, in the aspirating smoke sensing method for fire detection in the present embodiment, a step of particle concentration control is introduced before S503, and S504 to S506 are refined, based on the aspirating smoke sensing method for fire detection shown in FIG. 6. The method specifically includes following steps.

S601, obtaining, by the intake structure, an air sample.

S602, drawing, by the negative pressure source for air path detection, a part of the air sample, and allowing the air sample to enter the detection pipelines.

S603, performing, by the coagulator, a collisional coagulation on the air sample, so as to coagulate micro particle-size particles and small particle-size particles in the air sample into large particle-size particles.

S604, obtaining, by the charger, the air sample outputted from the coagulator.

S605, positively charging, by the charger, the particles in the air sample, so as to obtain a unipolar charged air sample with positively charged particles.

Optionally, the charge collector includes the bias electrode, the collecting electrode, and the collecting electric field formed by the bias electrode and the collecting electrode.

S606, receiving, by the charge collector, a control parameter sent by the controller.

S607, adjusting, by the charge collector, the voltage of the bias electrode according to the control parameter, so that the charged particles with different particle-sizes in the unipolar charged air sample fall onto collecting electrodes corresponding to particle-size grades of the charged particles.

Optionally, the collecting electrode includes the large particle collecting electrode and the small particle collecting electrode.

S608, obtaining, by the controller, voltage signals or current signals formed by charge quantities corresponding to charged particles in the large particle collecting electrode and the small particle collecting electrode.

S609, determining, by the controller, a cleanliness of a current environment according to the obtained voltage signal(s) or the current signal(s), and configuring a corresponding sensitivity parameter manually or automatically according to the cleanliness.

S610, determining, by the controller, corresponding fire detection information according to the voltage signal(s) or the current signal(s) of the large particle collecting electrode and/or the small particle collecting electrode in combination with the sensitivity configuration.

Figure 9:
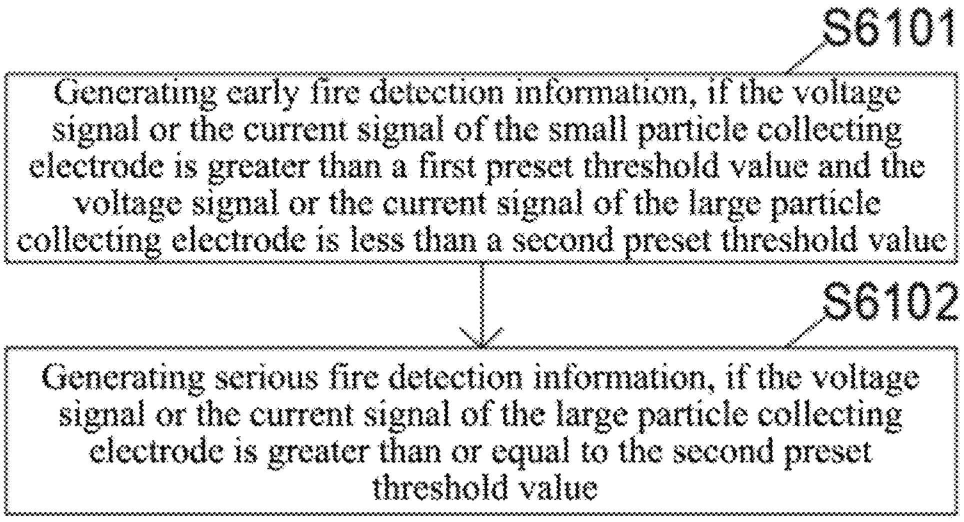
FIG. 9 is a flow chart of S610 in the embodiment shown in FIG. 8.

Optionally, as shown in FIG. 9, S610 includes two specific implementation steps, i.e., S6101 and S6102.

S6101, generating early fire detection information, if the voltage signal or the current signal of the small particle collecting electrode is greater than a first preset threshold value and the voltage signal or the current signal of the large particle collecting electrode is less than a second preset threshold value.

S6102, generating serious fire detection information, if the voltage signal or the current signal of the large particle collecting electrode is greater than or equal to the second preset threshold value.

Specific implementation methods of respective steps in the present method embodiment are the same as the implementation schemes in the aspirating smoke sensing device for fire detection shown in FIG. 4, which will not be repeated here.

Figure 10:
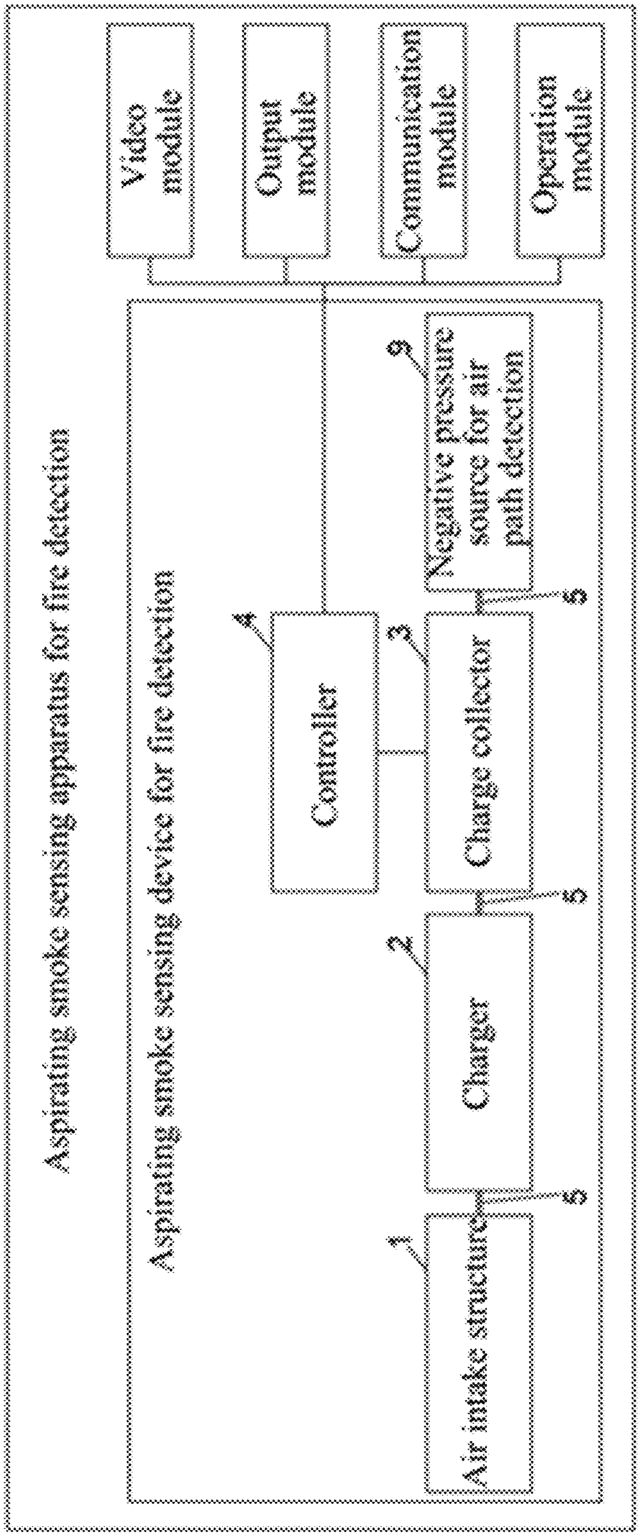
FIG. 10 is a schematic structural diagram of an aspirating smoke sensing apparatus for fire detection according to a seventh embodiment of the present disclosure.

FIG. 10 is a schematic structural diagram of an aspirating smoke sensing apparatus for fire detection according to a seventh embodiment of the present disclosure. As shown in FIG. 10, the aspirating smoke sensing apparatus for fire detection includes an output module, a communication module, an operation module, and a video module, and the aspirating smoke sensing device for fire detection according to any one of the first aspect of the embodiments of the present disclosure.

The output module, the communication module, the operation module and the video module are connected to the controller of the aspirating smoke sensing device for fire detection, respectively.

The output module is configured to output a fire detection signal outputted from the controller.

The communication module is configured to communicate with external electronic apparatus.

The operation module is configured for a user to operate the aspirating smoke sensing device for fire detection.

The video module is configured for a user to confirm and check a fire hazard in a place that is prone to generate nuisance smoke.

The video module is configured for a user to confirm and check a fire in an area that is prone to generate false alarms, such as a kitchen or a smoking area. The confirmation and check pattern includes a manual pattern or an automatic pattern. The video module is not configured for smoke detection, but is configured for manually or automatically determining whether a fire hazard exists through a case that whether a moving object exists in a video, when a place as a monitoring focus or a place where the nuisance smoke is easily generated (e.g., kitchen) gives an alarm.

Figure 11:
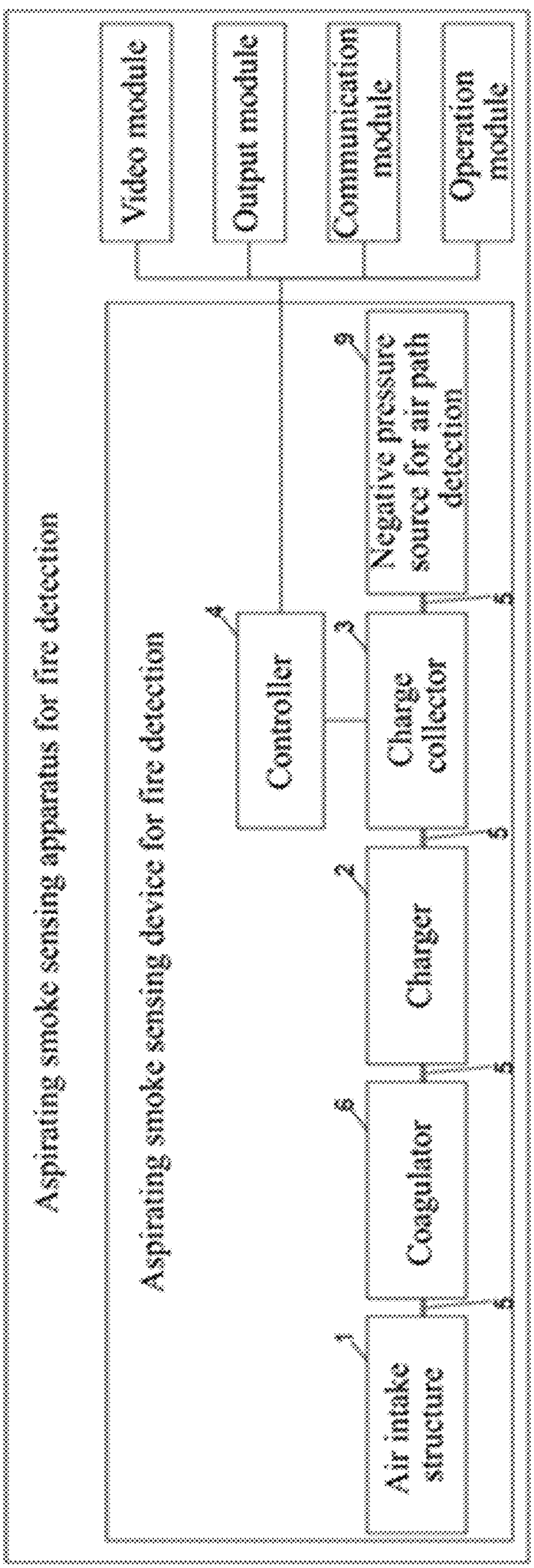
FIG. 11 is a schematic structural diagram of an aspirating smoke sensing apparatus for fire detection according to an eighth embodiment of the present disclosure.

FIG. 11 is a schematic structural diagram of an aspirating smoke sensing apparatus for fire detection according to an eighth embodiment of the present disclosure, which adopts the aspirating smoke sensing device for fire detection in the second embodiment (i.e., the coagulator is added), based on the aspirating smoke sensing apparatus for fire detection in the first embodiment shown in FIG. 10, and an implementation manner of which is the same as the implementation manner shown in FIG. 10.

Figure 12:
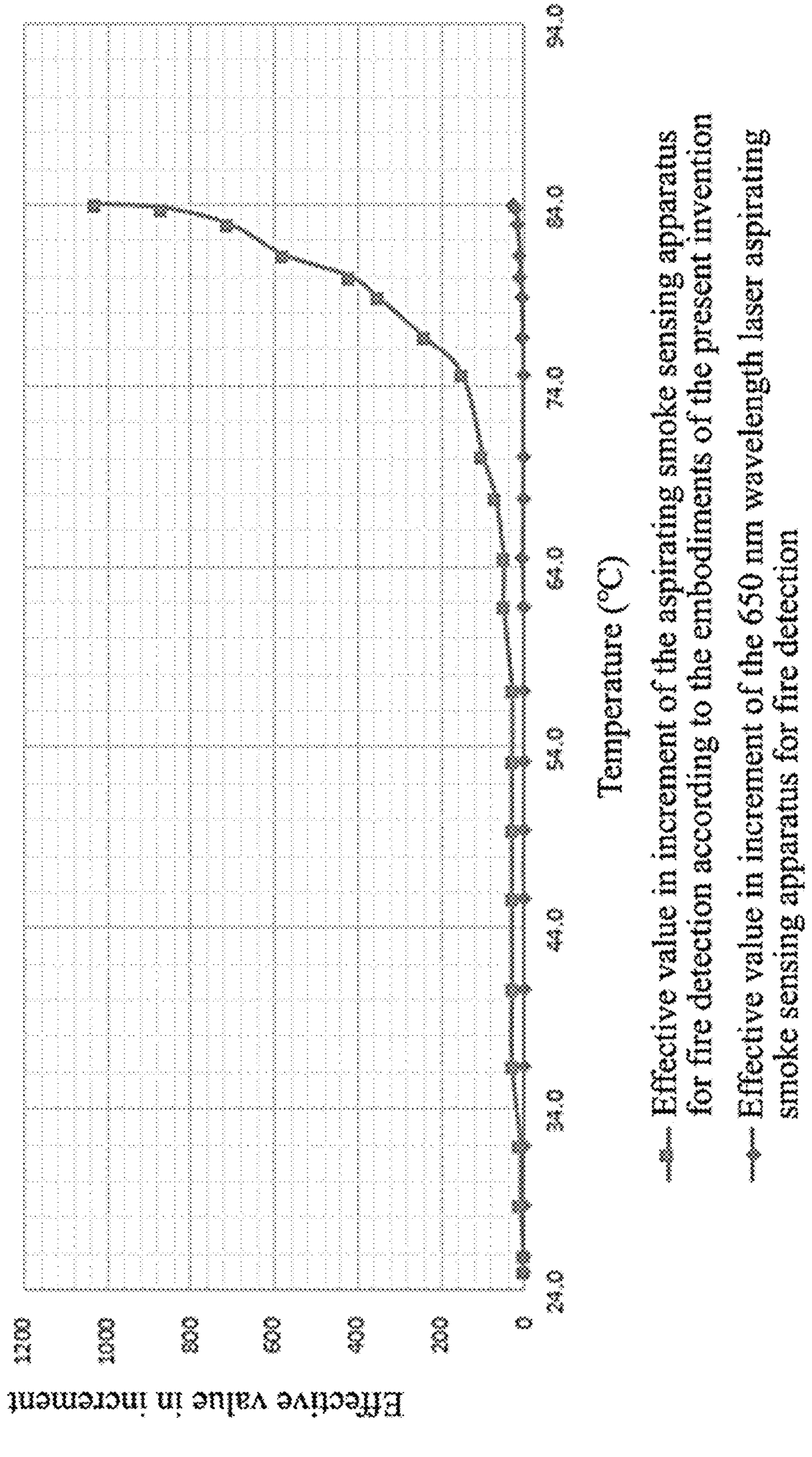
FIG. 12 is a graph of test data of an aspirating smoke sensing apparatus for fire detection according to embodiments of the present disclosure, and a laser aspirating smoke sensing apparatus for fire detection under a "pyrolysis PVC" test (i.e., a PVC block is heated slowly to generate particles)

FIG. 12 shows a comparison of effective values in increment of the aspirating smoke sensing apparatus for fire detection in the embodiments of the present disclosure, and a 650 nm wavelength laser aspirating smoke sensing apparatus for fire detection, with an increase of the surface temperature of a heated object under a "pyrolysis PVC" test. The "pyrolysis PVC" refers to heating a PVC block, and a surface of which is heated to release tiny particles. The aspirating smoke sensing apparatus for fire detection in the embodiments of the present disclosure starts to sense pyrolyzed nanoparticles when the surface temperature of the object is about 60° C., and the effective value in increment is 50. When the temperature reaches 84° C., the effective value in increment of the aspirating smoke sensing apparatus for fire detection in the embodiments of the present disclosure reaches 1,000. However, the 650 nm wavelength laser aspirating smoke sensing apparatus for fire detection hardly responds during the entire process of the test.

Figure 13:
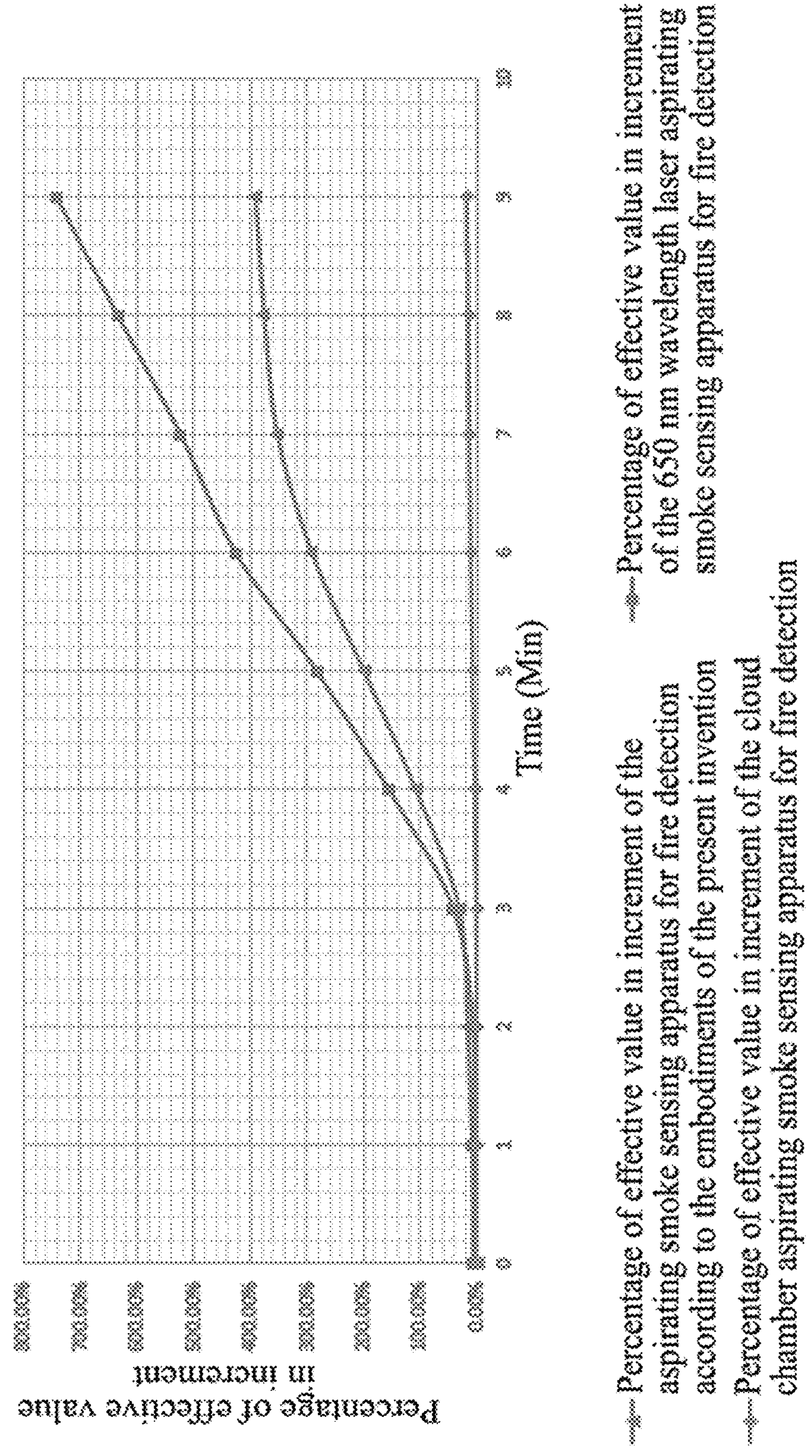
FIG. 13 is a graph of test data of an aspirating smoke sensing apparatus for fire detection according to embodiments of the present disclosure, a laser aspirating smoke sensing apparatus for fire detection, and a cloud chamber aspirating smoke sensing apparatus for fire detection under an "open flame burning of polyurethane" test.
Figure 14:
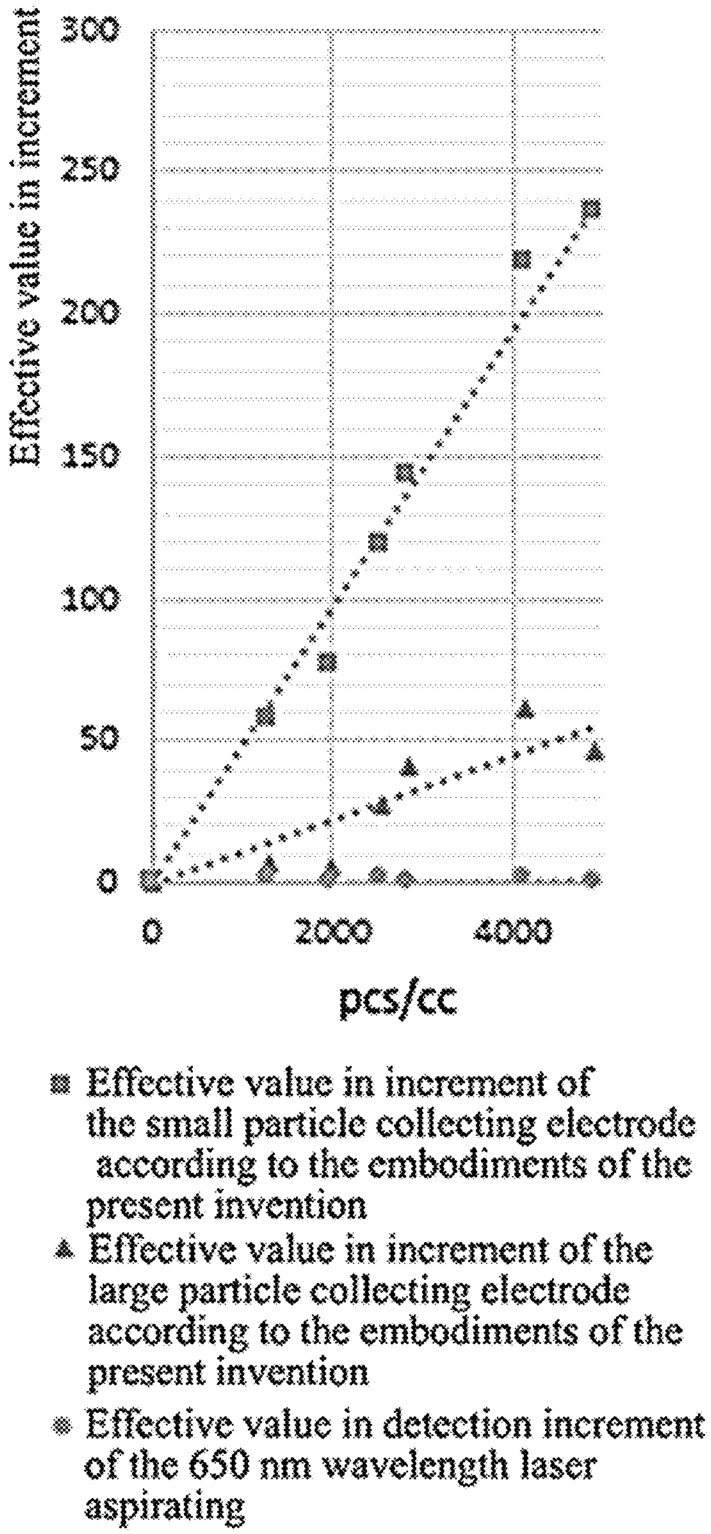
FIG. 14 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 20 nm PSL sphere test.
Figure 15:
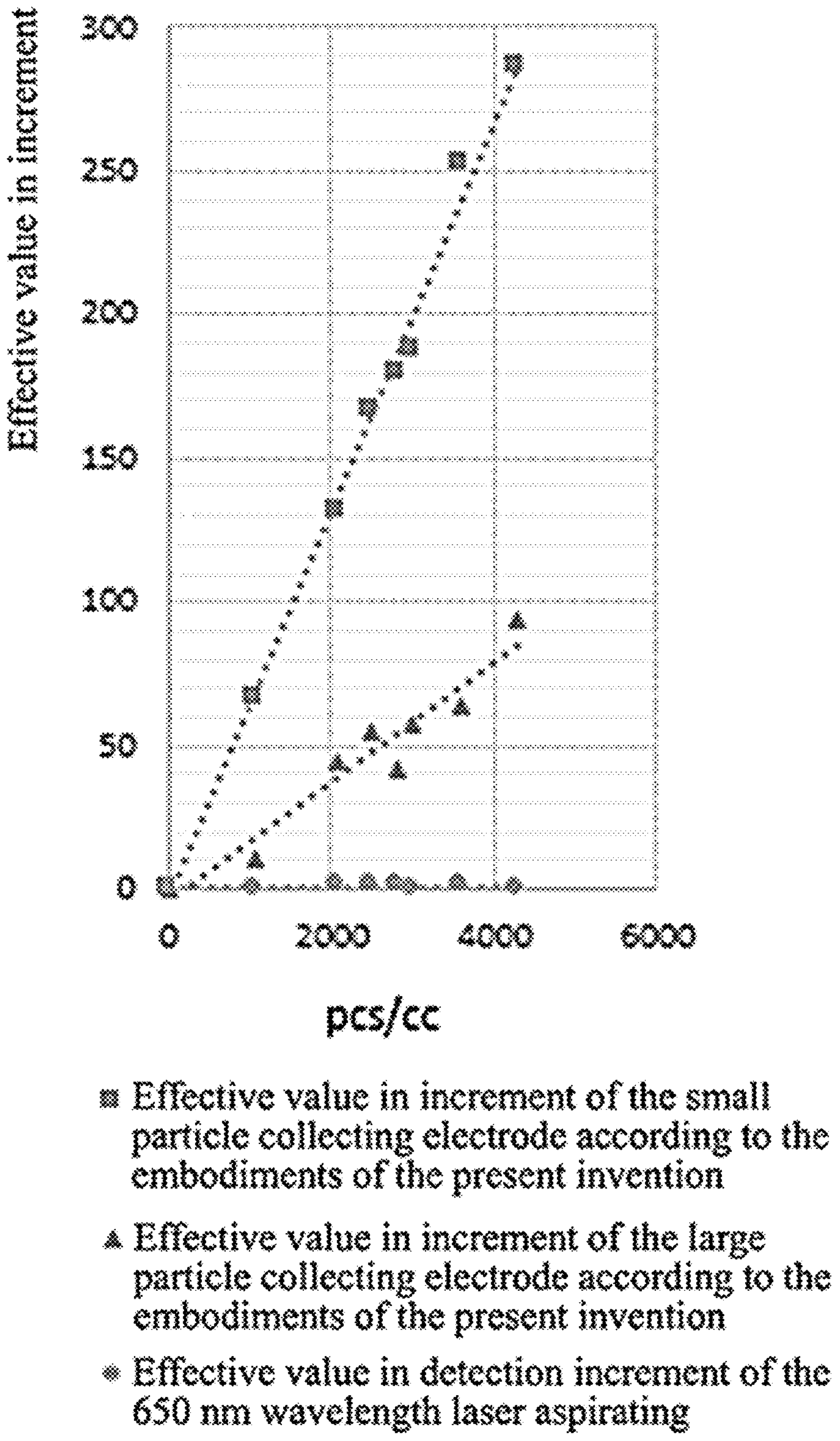
FIG. 15 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 50 nm PSL sphere test.
Figure 16:
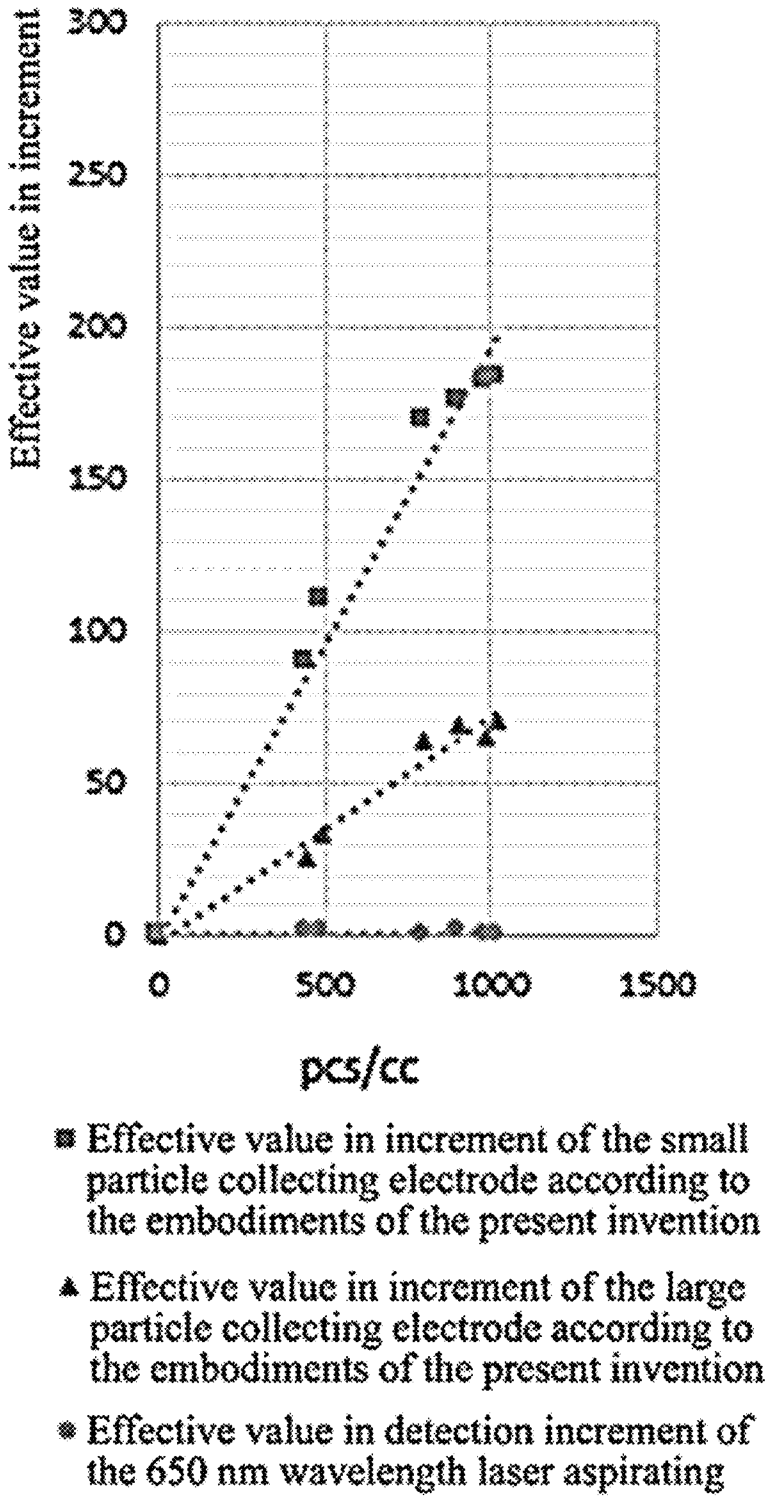
FIG. 16 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 100 nm PSL sphere test.
Figure 17:
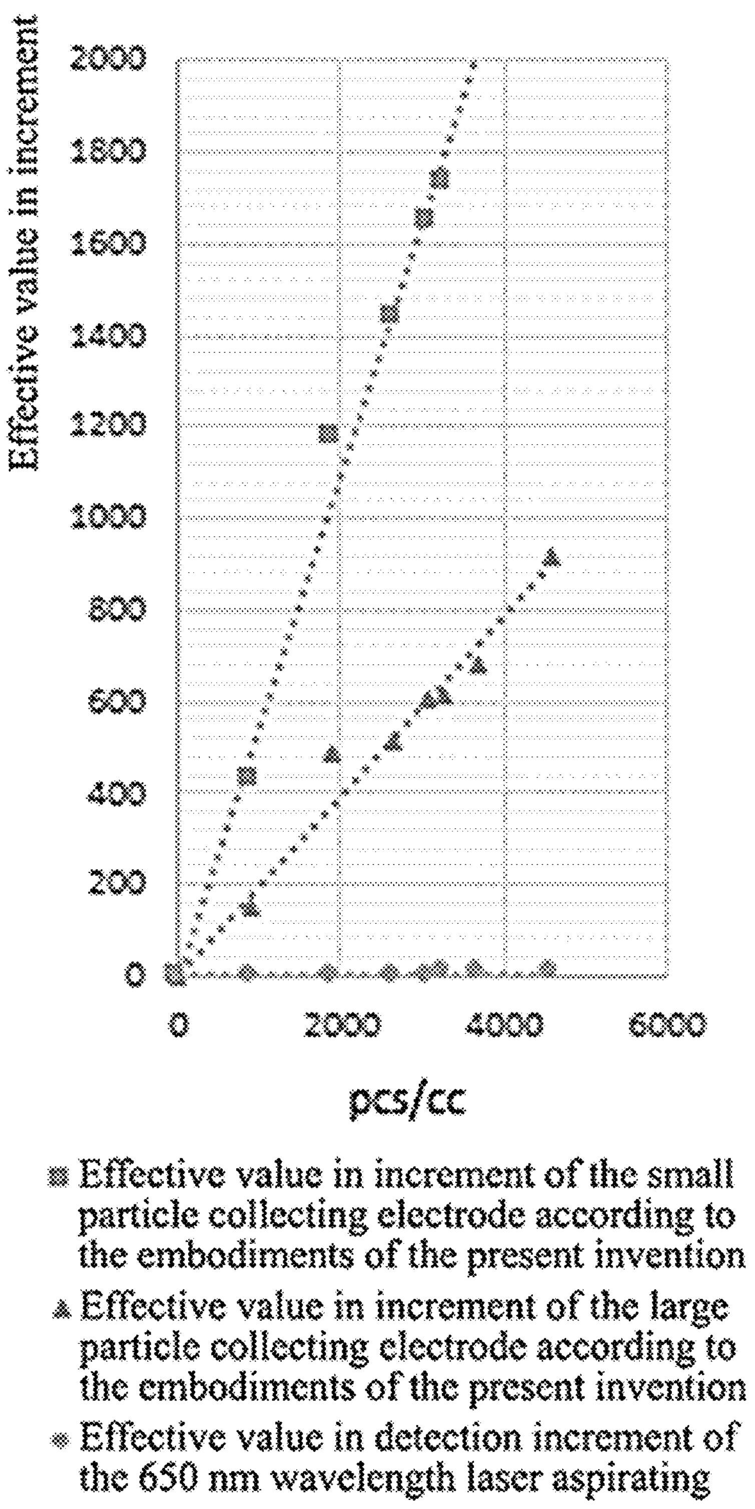
FIG. 17 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 150 nm PSL sphere test.
Figure 18:
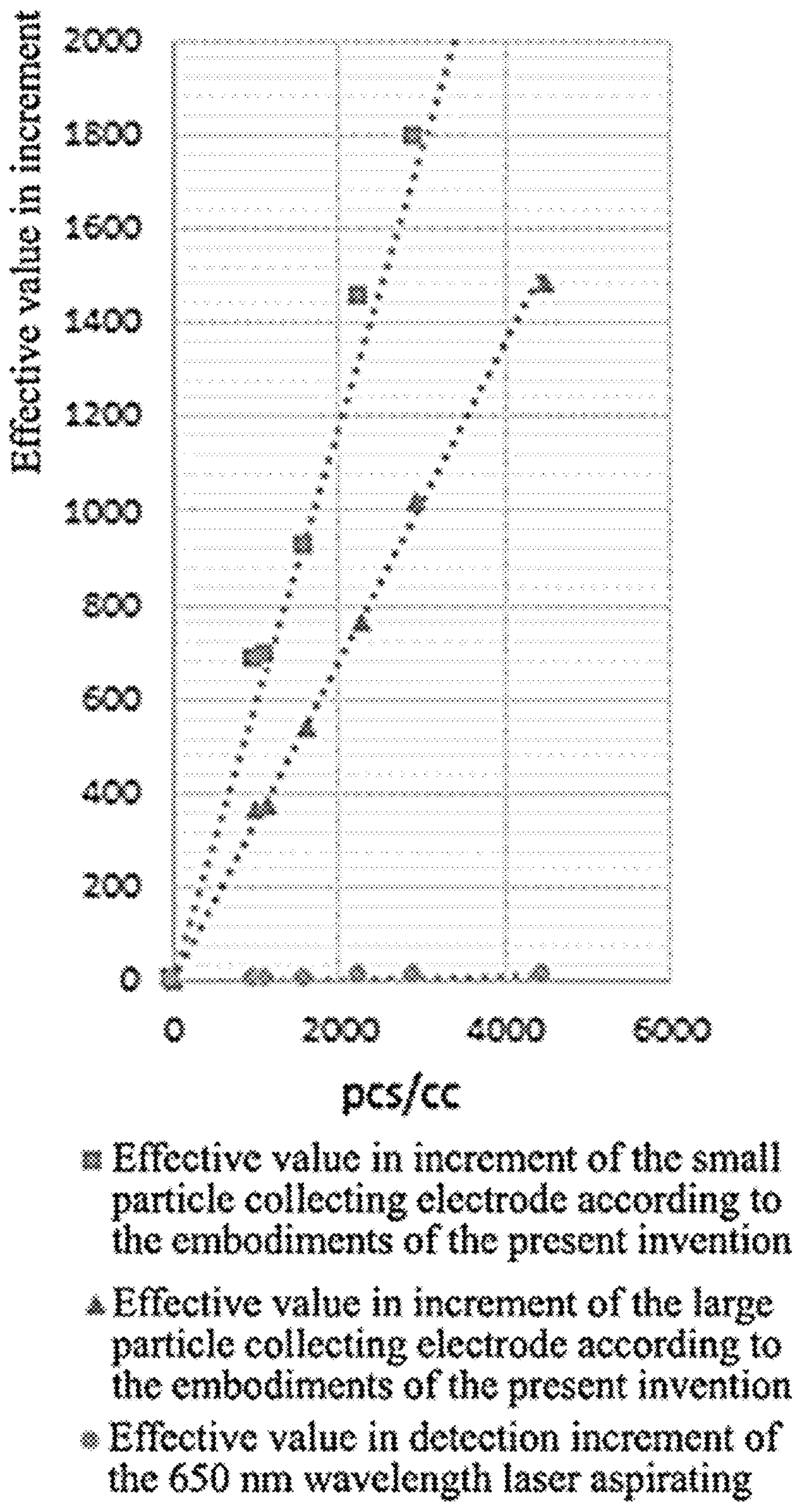
FIG. 18 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 200 nm PSL sphere test.

FIG. 13 shows a comparison of percentages between effective values in increment of the aspirating smoke sensing apparatus for fire detection in the embodiments of the present disclosure, the laser aspirating smoke sensing apparatus for fire detection, and the cloud chamber aspirating smoke sensing apparatus for fire detection under an "open flame burning of polyurethane" test and respective base numbers in an environment detected by the detection apparatuses before combustion. The "open flame burning of polyurethane" is a fast burning without smoldering, and a particle-size of a product is relatively large. The aspirating smoke sensing apparatus for fire detection in the embodiments of the present disclosure and the laser aspirating smoke sensing apparatus for fire detection sense large particles released in the test about 2 minutes after the combustion starts. However, the cloud chamber aspirating smoke sensing apparatus for fire detection has a smaller response during the entire test, and the effective value in increment thereof is much less than the base number, and is almost submerged in the base numbers of normal environmental fluctuation.

FIGS. 14 to 19 show comparisons of effective value curves in increment of the aspirating smoke sensing apparatus for fire detection in the embodiments of the present disclosure, and the 650 nm wavelength laser aspirating smoke sensing apparatus for fire detection under PSL sphere tests releasing different particle-sizes and concentrations.

Remarks: PSL microspheres (polystyrene spheres) are currently standard monodisperse spherical nanospheres with a diameter ranging from 20 nm to hundreds of microns, which are generally used for instrument calibration for comparison of various biomolecular sizes in medicine.

Figure 19:
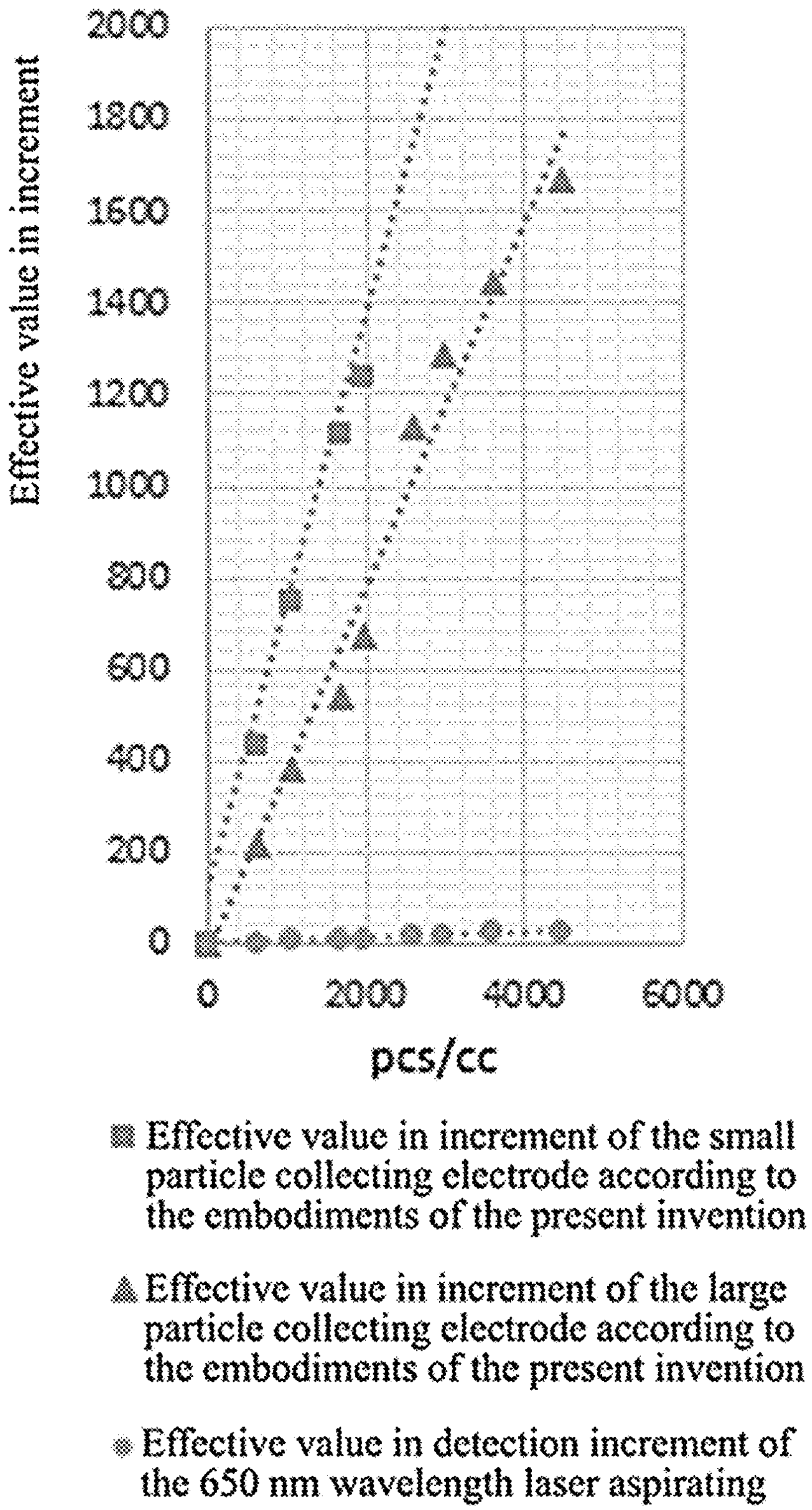
FIG. 19 is a comparison graph of effective value curves in detection increment of a large particle collecting electrode and a small particle collecting electrode of an aspirating smoke sensing apparatus for fire detection according to embodiments of the present disclosure, and a 650 nm laser aspirating smoke sensing apparatus for fire detection under a 250 nm PSL sphere test.

In a clean state, a special apparatus such as TSI3480 Aerosol Generator is used to produce PSL nanospheres of a certain particle-size and concentration. The number and center particle-size of the produced spheres per unit volume are measured by TSI3910 NanoScan SMPS. Data obtained show that the aspirating smoke sensing apparatus for fire detection in the embodiments of the present disclosure senses particles with particle-sizes of 20 nm, 50 nm, 100 nm, 150 nm, 200 nm, and 250 nm, and the effective values in increment are particularly large. However, the 650 nm wavelength laser aspirating smoke sensing apparatus for fire detection only has a slight perception when detecting particles with a particle-size of 250 nm (as shown in FIG. 19), and fails to sense particles with a particle-size below 250 nm (as shown in FIGS. 14 to 18). Therefore, in an actual pyrolysis fire detection, the aspirating detection apparatus in the embodiments of the present disclosure has a very strong detection ability for an early release stage of nano-particles, and is able to really realize the extremely early detection of fire alarms.

In the several embodiments provided by the present disclosure, it should be understood that the disclosed device and system may be implemented in other ways. For example, the device embodiments described above are only schematic. For example, the division of modules is only a logical function division, and other divisions may exist in an actual implementation. For example, a plurality of modules or components may be combined or integrated into another system, or some features may be ignored, or not be implemented. In addition, the displayed or discussed couplings or direct couplings or communication connections with each other may be indirect couplings or communication connections through some interfaces, devices or modules, and may be in electrical, mechanical or other forms. Those skilled in the art will easily conceive of other embodiments of the present disclosure after considering the specification and practicing the disclosure disclosure herein. The present disclosure is intended to cover any variations, uses, or adaptive changes of the present disclosure. These variations, uses, or adaptive changes follow the general principles of the present disclosure, and include common knowledge or conventional technical means in the technical field that are not disclosed in the present disclosure. The description and the embodiments are to be regarded as exemplary only, and the true scope and spirit of the present disclosure are pointed out by following claims.

It should be understood that the present disclosure is not limited to the precise structures that have been described above and shown in the drawings, and various modifications and changes may be made without departing from the scopes thereof. The scope of the present disclosure is only limited by the appended claims.

What is claimed is:

1. An aspirating smoke sensing device for fire detection, comprising: a charger, a charge collector, a controller, an air intake structure, and a negative pressure source for air path detection, wherein the air intake structure is communicated with an input port of the charger, an output port of the charger is communicated with the charge collector, an output port of the charge collector is connected to the negative pressure source for air path detection, and the controller is electrically connected to the charge collector;

the air intake structure is configured to obtain an air sample;

the charger is configured to perform a unipolar charging on the air sample, so as to output a unipolar charged air sample;

the charge collector is configured to obtain the unipolar charged air sample and separate charged particles with different particle-sizes in the unipolar charged air sample, so as to obtain charged particles of different particle-size grades;

the negative pressure source for air path detection draws the air sample into the charger and the charge collector, and discharges the air sample; and the controller is configured to determine fire detection information according to charge quantities corresponding to the charged particles of different particle-size grades.

2. The device according to claim 1, wherein the aspirating smoke sensing device for fire detection further comprises a coagulator, an input port of the coagulator being communicated with the air intake structure and an output port of the coagulator being communicated with the charger; and the coagulator is configured to perform a collisional coagulation on the air sample, so as to coagulate micro particle-size particles and small particle-size particles in the air sample into large particle-size particles.

3. The device according to claim 2, wherein the coagulator is specifically configured to:

perform a bipolar charging the air sample, so as to obtain a bipolar charged air sample;

perform the collisional coagulation on the bipolar charged air sample, so as to increase particle-sizes of particles in the air sample;

the particles in the air sample including the micro particle-size particles, the small particle-size particles, and large particle-size particles.

4. The device according to claim 2, wherein the aspirating smoke sensing device for fire detection further comprises a first filter and a second filter, an input port of the first filter being communicated with the air intake structure, an output port of the first filter being communicated with an input port of the second filter and the input port of the coagulator respectively, and an output port of the second filter being communicated with another input port of the coagulator;

a filtering material of the first filter has a larger gap than a filtering material of the second filter;

the first filter is configured to filter the air sample, so as to obtain a first filtered air sample;

the second filter is configured to filter the first filtered air sample, so as to obtain a second filtered air sample that is a clean air; correspondingly, when performing the collisional coagulation on the air sample to increase the particle-sizes of the particles in the air sample, the coagulator is specifically configured to:

mix the first filtered air sample and the second filtered air sample, so as to obtain a mixed gas sample with a preset particle concentration;

the second filtered air sample is the clean air, and serves to purge and protect bipolar charging needles in the coagulator while blowing out positive and negative ion flows between the bipolar charging needles to be mixed with the first filtered air sample, and the collisional coagulation is performed on the mixed gas sample, so as to increase the particle-sizes of the particles in the air sample.

5. The device according to claim 1, wherein the charger is a positive-charge charger, and the charger is specifically configured to:

obtain the air sample transmitted by the air intake structure;

perform a positive charging on particles in the air sample, so as to obtain a unipolar charged air sample with positively charged particles.

6. The device according to claim 1, wherein the charge collector comprises a bias electrode, a collecting electrode, and a collecting electric field formed by the bias electrode and the collecting electrode, and a negative pressure fluid field; the collecting electrode comprising a plurality of sub-collecting electrodes, and the charge collector is specifically configured to:

the negative pressure fluid field being an air path model for endowing particles in the air sample with kinetic energy to move forward formed, which is formed between the negative pressure source for air path detection and an annular narrow jet orifice of the air sample in the charge collecting electrode;

receive a control parameter sent by the controller;

adjust a voltage of the bias electrode according to the control parameter, so that the charged particles with different particle-sizes in the unipolar charged air sample fall onto sub-collecting electrodes corresponding to particle-size grades of the charged particles.

7. The device according to claim 6, wherein the controller is specifically configured to:

obtain voltage signals or current signals formed by charge quantities corresponding to charged particles in respective sub-collecting electrodes;

determine corresponding fire detection information according to the voltage signals or the current signals corresponding to the respective sub-collecting electrodes;

judge a cleanliness of a currently monitored environment in real time according to the collected voltage or current signals, and adjusting a sensitivity correspondingly according to the cleanliness of the current environment, so as to achieve a best sensitivity of fire monitoring and air cleanliness monitoring.

8. The device according to claim 7, wherein the sub-collecting electrodes comprise a large particle collecting electrode and a small particle collecting electrode.

9. The device according to claim 8, wherein when determining the corresponding fire detection information according to the voltage signals or the current signals corresponding to the sub-collecting electrodes, the controller is specifically configured to:

generate early fire detection information, if the voltage signal or the current signal of the small particle collecting electrode is greater than a first preset threshold value and the voltage signal or the current signal of the large particle collecting electrode is less than a second preset threshold value; and generate serious fire detection information, if the voltage signal or the current signal of the large particle collecting electrode is greater than or equal to the second preset threshold value.

10. An aspirating smoke sensing method for fire detection, wherein the method is applied to an aspirating smoke sensing device for fire detection, and the device comprises a coagulator, a charger, a charge collector, a controller, an air intake structure, and a negative pressure source for air path detection; the method comprises:

obtaining, by the air intake structure, an air sample;

coagulating and enlarging, by the coagulator, micro and small particles in the air sample, the air sample passing through the coagulator;

performing, by the charger, a unipolar charging on the air sample, so as to output a unipolar charged air sample;

obtaining, by the charge collector, the unipolar charged air sample, and making charged particles with different particle-sizes in the unipolar charged air sample fall onto corresponding collecting electrodes;

forming, by the negative pressure source for air path detection, a negative pressure area in the charger, the collector and pipelines, so as to draw the air sample obtained by the air intake structure into the charger and the charge collector, and discharge the air sample;

generating, by the controller, fire detection information according to charge quantity obtained by the collecting electrodes.

11. An aspirating smoke sensing apparatus for fire detection, comprising the aspirating smoke sensing device for fire detection according to claim 1 and a processor; wherein the processor is connected to a controller of the aspirating smoke sensing device for fire detection, and is configured to:

output a fire detection signal outputted from the controller;

communicate with external electronic devices;

for a user to operate the aspirating smoke sensing device for fire detection; and for a user to confirm and check a fire in an area that is prone to generate nuisance smoke, wherein a confirmation and check pattern comprises a manual pattern or an automatic pattern.

12. The aspirating smoke sensing apparatus according to claim 11, wherein the aspirating smoke sensing device for fire detection further comprises a coagulator, an input port of the coagulator being communicated with the air intake structure and an output port of the coagulator being communicated with the charger; and the coagulator is configured to perform a collisional coagulation on the air sample, so as to coagulate micro particle-size particles and small particle-size particles in the air sample into large particle-size particles.

13. The aspirating smoke sensing apparatus according to claim 12, wherein the coagulator is specifically configured to:

perform a bipolar charging the air sample, so as to obtain a bipolar charged air sample;

perform the collisional coagulation on the bipolar charged air sample, so as to increase particle-sizes of particles in the air sample;

the particles in the air sample including the micro particle-size particles, the small particle-size particles, and large particle-size particles.

14. The aspirating smoke sensing apparatus according to claim 12, wherein the aspirating smoke sensing device for fire detection further comprises a first filter and a second filter, an input port of the first filter being communicated with the air intake structure, an output port of the first filter being communicated with an input port of the second filter and the input port of the coagulator respectively, and an output port of the second filter being communicated with another input port of the coagulator;

a filtering material of the first filter has a larger gap than a filtering material of the second filter;

the first filter is configured to filter the air sample, so as to obtain a first filtered air sample;

the second filter is configured to filter the first filtered air sample, so as to obtain a second filtered air sample that is a clean air; correspondingly, when performing the collisional coagulation on the air sample to increase the particle-sizes of the particles in the air sample, the coagulator is specifically configured to:

mix the first filtered air sample and the second filtered air sample, so as to obtain a mixed gas sample with a preset particle concentration;

the second filtered air sample is the clean air, and serves to purge and protect bipolar charging needles in the coagulator while blowing out positive and negative ion flows between the bipolar charging needles to be mixed with the first filtered air sample, and the collisional coagulation is performed on the mixed gas sample, so as to increase the particle-sizes of the particles in the air sample.

15. The aspirating smoke sensing apparatus according to claim 11, wherein the charger is a positive-charge charger, and the charger is specifically configured to:

obtain the air sample transmitted by the air intake structure;

perform a positive charging on particles in the air sample, so as to obtain a unipolar charged air sample with positively charged particles.

16. The aspirating smoke sensing apparatus according to claim 11, wherein the charge collector comprises a bias electrode, a collecting electrode, and a collecting electric field formed by the bias electrode and the collecting electrode, and a negative pressure fluid field; the collecting electrode comprising a plurality of sub-collecting electrodes, and the charge collector is specifically configured to:

the negative pressure fluid field being an air path model for endowing particles in the air sample with kinetic energy to move forward formed, which is formed between the negative pressure source for air path detection and an annular narrow jet orifice of the air sample in the charge collecting electrode;

receive a control parameter sent by the controller;

adjust a voltage of the bias electrode according to the control parameter, so that the charged particles with different particle-sizes in the unipolar charged air sample fall onto sub-collecting electrodes corresponding to particle-size grades of the charged particles.

17. The aspirating smoke sensing apparatus according to claim 16, wherein the controller is specifically configured to:

obtain voltage signals or current signals formed by charge quantities corresponding to charged particles in respective sub-collecting electrodes;

determine corresponding fire detection information according to the voltage signals or the current signals corresponding to the respective sub-collecting electrodes;

judge a cleanliness of a currently monitored environment in real time according to the collected voltage or current signals, and adjusting a sensitivity correspondingly according to the cleanliness of the current environment, so as to achieve a best sensitivity of fire monitoring and air cleanliness monitoring.

18. The aspirating smoke sensing apparatus according to claim 17, wherein the sub-collecting electrodes comprise a large particle collecting electrode and a small particle collecting electrode.

19. The aspirating smoke sensing apparatus according to claim 18, wherein when determining the corresponding fire detection information according to the voltage signals or the current signals corresponding to the sub-collecting electrodes, the controller is specifically configured to:

generate early fire detection information, if the voltage signal or the current signal of the small particle collecting electrode is greater than a first preset threshold value and the voltage signal or the current signal of the large particle collecting electrode is less than a second preset threshold value; and generate serious fire detection information, if the voltage signal or the current signal of the large particle collecting electrode is greater than or equal to the second preset threshold value.

* * * * *